US012143802B2

(12) United States Patent
Hatanaka et al.

(10) Patent No.: US 12,143,802 B2
(45) Date of Patent: Nov. 12, 2024

(54) SIGNAL PROCESSING DEVICE AND METHOD

(71) Applicant: SONY GROUP CORPORATION, Tokyo (JP)

(72) Inventors: Mitsuyuki Hatanaka, Tokyo (JP); Toru Chinen, Tokyo (JP); Minoru Tsuji, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 113 days.

(21) Appl. No.: 17/756,867

(22) PCT Filed: Dec. 3, 2020

(86) PCT No.: PCT/JP2020/044986
§ 371 (c)(1),
(2) Date: Jun. 3, 2022

(87) PCT Pub. No.: WO2021/124903
PCT Pub. Date: Jun. 24, 2021

(65) Prior Publication Data

US 2023/0007423 A1 Jan. 5, 2023

(30) Foreign Application Priority Data

Dec. 17, 2019 (JP) ................................ 2019-227551

(51) Int. Cl.
*G10L 19/008* (2013.01)
*G10L 19/16* (2013.01)
(Continued)

(52) U.S. Cl.
CPC ............ *H04S 7/302* (2013.01); *G10L 19/008* (2013.01); *G10L 19/167* (2013.01); *H04S 3/008* (2013.01);
(Continued)

(58) Field of Classification Search
CPC .... H04S 3/008; H04S 2400/11; G10L 19/008; G10L 19/167
See application file for complete search history.

(56) References Cited

FOREIGN PATENT DOCUMENTS

| | | | |
|---|---|---|---|
| EP | 3096539 | A1 | 11/2016 |
| EP | 3779976 | A1 | 2/2021 |
| WO | 2019/198486 | A1 | 10/2019 |

OTHER PUBLICATIONS

"Information technology—High efficiency coding and media delivery in heterogeneous environments—Part 3: 3D audio", International Organization for Standardization, ISO/IEC 23008-3, Feb. 2019, 441 pages.

(Continued)

*Primary Examiner* — Ping Lee
(74) *Attorney, Agent, or Firm* — CHIP LAW GROUP

(57) ABSTRACT

The present technology relates to a signal processing device, a method, and a program capable of improving transmission efficiency and efficiency in the data processing amount. A signal processing device includes: an acquisition unit that acquires polar coordinate position information indicating a position of a first object expressed by polar coordinates, audio data of the first object, absolute coordinate position information indicating a position of a second object expressed by absolute coordinates, and audio data of the second object; a coordinate conversion unit that converts the absolute coordinate position information into polar coordinate position information indicating a position of the second object; and a rendering processing unit that performs rendering processing on the basis of the polar coordinate position information and the audio data of the first object and the polar coordinate position information and the audio data of the second object. The present technology can be applied to a content reproduction system.

20 Claims, 18 Drawing Sheets

(51) Int. Cl.
*H04S 3/00* (2006.01)
*H04S 7/00* (2006.01)

(52) U.S. Cl.
CPC .......... *H04S 7/303* (2013.01); *H04S 2400/01* (2013.01); *H04S 2400/11* (2013.01); *H04S 2400/13* (2013.01)

(56) References Cited

OTHER PUBLICATIONS

International Search Report and Written Opinion of PCT Application No. PCT/JP2020/044986, issued on Jan. 19, 2021, 08 pages of ISRWO.

FIG. 2

| syntax | bits | |
|---|---|---|
| fvp_audio_objpos() { | | |
| for(i=0; i<NumOfObjects; i++) { | | |
| PosCodingMode[i]; | 2 | 0: ABSOLUTE COORDINATE OBJECT<br>1: POLAR COORDINATE OBJECT: USE POLAR COORDINATE POSITION INFORMATION (FIXED ANGLE, FIXED GAIN)<br>2: POLAR COORDINATE OBJECT: USE POLAR COORDINATE POSITION INFORMATION (FIXED ANGLE, VARIABLE GAIN)<br>3: POLAR COORDINATE OBJECT: USE POLAR COORDINATE POSITION INFORMATION (VARIABLE ANGLE, VARIABLE GAIN) |
| if(PosCodingMode[i]==0) { | | |
| nbits=ChildCubeDivIndex[i]; | 5 | QUANTIZATION BIT DEPTH OF EACH OBJECT |
| QposX[i]; | nbits | QUANTIZATION X COORDINATE VALUE OF i-TH OBJECT |
| QposY[i]; | nbits | QUANTIZATION Y COORDINATE VALUE OF i-TH OBJECT |
| QposZ[i]; | nbits | QUANTIZATION Z COORDINATE VALUE OF i-TH OBJECT |
| } | | |
| } | | |
| } | | |

SIGNAL PROCESSING DEVICE AND METHOD

CROSS REFERENCE TO RELATED APPLICATIONS

This application is a U.S. National Phase of International Patent Application No. PCT/JP2020/044986 filed on Dec. 3, 2020, which claims priority benefit of Japanese Patent Application No. JP 2019-227551 filed in the Japan Patent Office on Dec. 17, 2019. Each of the above-referenced applications is hereby incorporated herein by reference in its entirety.

TECHNICAL FIELD

The present technology relates to a signal processing device, a method, and a program, and more particularly to a signal processing device, a method, and a program capable of improving transmission efficiency.

BACKGROUND ART

The conventional moving picture experts group (MPEG)-H coding standard standardized as 3D audio for fixed viewpoint is based on an idea that an audio object moves in a space around the position of a listener as an origin (see Non-Patent Document 1, for example).

For this reason, with the fixed viewpoint, the position information of each audio object viewed from the listener at the origin is described by polar coordinates using the angle in the horizontal direction, the angle in the height direction, and the distance from the listener to the audio object.

By using such an MPEG-H coding standard, in a fixed viewpoint content, a sound image of each audio object can be localized in the position of each audio object in the space, and audio reproduction with a high realistic feeling can be achieved.

CITATION LIST

Non-Patent Document

Non-Patent Document 1: ISO/IEC 23008-3 Information technology—High efficiency coding and media delivery in heterogeneous environments—Part 3: 3D audio

SUMMARY OF THE INVENTION

Problems to be Solved by the Invention

On the other hand, a free viewpoint content in which an arbitrary position in the space can be set as the position of the listener is also known. With the free viewpoint, not only does the audio object move, but also the listener is movable in the space. That is, the free viewpoint is different from the fixed viewpoint in that the listener is movable.

In such a free viewpoint audio, both the audio object and the listener move.

Accordingly, in a case where the position information of each audio object in the space is coded, if the position of the audio object is expressed by polar coordinates around the listener used for coding in the fixed viewpoint, there may be a case where the position information is not transmitted efficiently.

For example, with the fixed viewpoint, if the audio object is stationary, the relative positional relationship between the listener and the audio object does not change. Hence, it is only necessary to code and transmit the position information when the audio object moves.

However, with the free viewpoint, even if the audio object is stationary, if the listener moves, it is necessary to code and transmit the position information for all the audio objects. Hence, transmission efficiency is reduced.

Hence, from the viewpoint of transmission efficiency of position information, it is considered advantageous to express the position of each audio object by absolute coordinates in the free viewpoint.

However, in some cases, it may be desirable to reproduce sounds such as ground noise and reverberant sound around the listener, ground noise and reverberant sound having low dependence on the absolute position in the space and surrounding the listener.

Additionally, other than ground noise and reverberant sound, it is also conceivable to use an audio object such as a sound effect intended for the listener.

The present technology has been made in view of such a situation, and aims to improve transmission efficiency.

Solutions to Problems

A signal processing device according to a first aspect of the present technology includes: an acquisition unit that acquires polar coordinate position information indicating a position of a first object expressed by polar coordinates, audio data of the first object, absolute coordinate position information indicating a position of a second object expressed by absolute coordinates, and audio data of the second object; a coordinate conversion unit that converts the absolute coordinate position information into polar coordinate position information indicating a position of the second object; and a rendering processing unit that performs rendering processing on the basis of the polar coordinate position information and the audio data of the first object and the polar coordinate position information and the audio data of the second object.

A signal processing method or a program according to the first aspect of the present technology includes the steps of: acquiring polar coordinate position information indicating a position of a first object expressed by polar coordinates, audio data of the first object, absolute coordinate position information indicating a position of a second object expressed by absolute coordinates, and audio data of the second object; converting the absolute coordinate position information into polar coordinate position information indicating a position of the second object; and performing rendering processing on the basis of the polar coordinate position information and the audio data of the first object and the polar coordinate position information and the audio data of the second object.

In the first aspect of the present technology, polar coordinate position information indicating a position of a first object expressed by polar coordinates, audio data of the first object, absolute coordinate position information indicating a position of a second object expressed by absolute coordinates, and audio data of the second object are acquired; the absolute coordinate position information is converted into polar coordinate position information indicating a position of the second object; and rendering processing is performed on the basis of the polar coordinate position information and the audio data of the first object and the polar coordinate position information and the audio data of the second object.

A signal processing device according to a second aspect of the present technology includes: a polar coordinate position information coding unit that codes polar coordinate position information indicating a position of a first object expressed by polar coordinates; an absolute coordinate position information coding unit that codes absolute coordinate position information indicating a position of a second object expressed by absolute coordinates; an audio coding unit that codes audio data of the first object and audio data of the second object; and a bit stream generation unit that generates a bit stream including the coded polar coordinate position information, the coded absolute coordinate position information, the coded audio data of the first object, and the coded audio data of the second object.

A signal processing method or a program according to the second aspect of the present technology includes the steps of: coding polar coordinate position information indicating a position of a first object expressed by polar coordinates; coding absolute coordinate position information indicating a position of a second object expressed by absolute coordinates; coding audio data of the first object and audio data of the second object; and generating a bit stream including the coded polar coordinate position information, the coded absolute coordinate position information, the coded audio data of the first object, and the coded audio data of the second object.

In the second aspect of the present technology, polar coordinate position information indicating a position of a first object expressed by polar coordinates is coded; absolute coordinate position information indicating a position of a second object expressed by absolute coordinates is coded; audio data of the first object and audio data of the second object are coded; and a bit stream including the coded polar coordinate position information, the coded absolute coordinate position information, the coded audio data of the first object, and the coded audio data of the second object is generated.

BRIEF DESCRIPTION OF DRAWINGS

FIG. 2 is a diagram illustrating an example of a bit stream format.

MODES FOR CARRYING OUT THE INVENTION

Figure 1:
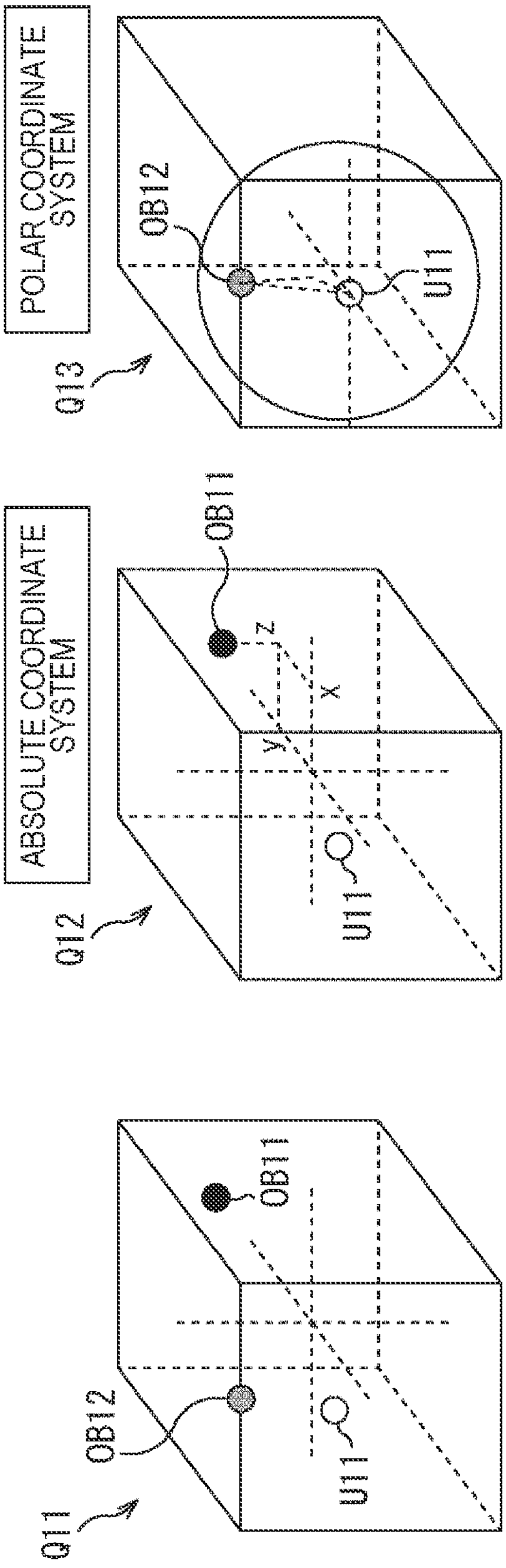
FIG. 1 is a diagram for describing an object and a coordinate system.

Hereinafter, embodiments to which the present technology is applied will be described with reference to the drawings.

First Embodiment

<Present Technology>

The present technology is provided to improve transmission efficiency by combining polar coordinate position information expressed by polar coordinates and absolute coordinate position information expressed by absolute coordinates in a case where position information of an audio object (hereinafter also simply referred to as object) is coded and transmitted.

In the present technology, on the server side, audio data for reproducing sound of one or a plurality of objects and polar coordinate position information or absolute coordinate position information indicating the position of each object are coded and transmitted to a client.

Additionally, the client reproduces free viewpoint audio content including the sound of each object on the basis of the audio data of each object received from the server and the polar coordinate position information or absolute coordinate position information of each object.

For example, in a case where absolute coordinate position information in which the position of an object in the space is expressed by absolute coordinates is coded and transmitted to the client, the server acquires listener position information in which the position of the listener in the space is expressed by absolute coordinates from the client and generates absolute coordinate position information.

At this time, the server may generate the absolute coordinate position information indicating the position of the object with accuracy corresponding to the positional relationship between the listener and the object, such as the distance from the listener to the object.

Specifically, for example, as the distance from the listener to the object decreases, absolute coordinate position information with higher accuracy, that is, absolute coordinate position information indicating a more accurate position is generated.

This is because, while the position of the object is shifted depending on the quantization accuracy (quantization step size) at the time of coding, as the distance from the listener to the object increases, the magnitude (tolerance) of the position shift that does not make the listener feel the shift of the localization position of the sound image increases.

Accordingly, by generating and transmitting the absolute coordinate position information with appropriate accuracy according to the positional relationship between the listener and the object, the amount of information (bit depth) of the absolute coordinate position information can be reduced without causing the user to feel the shift of the sound image position.

Note that while absolute coordinate position information with necessary accuracy may be generated every time absolute coordinate position information is transmitted, it is also possible to prepare coded absolute coordinate position information with the highest accuracy in advance, and use the coded absolute coordinate position information to generate absolute coordinate position information with necessary accuracy.

Specifically, for example, assume that highest-accuracy absolute coordinate position information obtained by quantizing absolute coordinates indicating a position of an object in a space with predetermined quantization accuracy is prepared in advance. The highest-accuracy absolute coordinate position information is coded absolute coordinate position information.

The server obtains absolute coordinate position information obtained by quantizing absolute coordinates of an object with arbitrary quantization accuracy by extracting a part of the highest-accuracy absolute coordinate position information according to a condition on the listener side designated by the client, such as listener position information. That is, coded absolute coordinate position information indicating the position of the object can be obtained with arbitrary accuracy.

On the other hand, in a case where polar coordinate position information in which the position of an object in the space is expressed in polar coordinates is coded and transmitted to the client, the server generates polar coordinate position information on the basis of position information such as absolute coordinates indicating the position of the object in the space prepared in advance and listener position information.

For example, as illustrated in FIG. 1, there are mainly two types of objects in three-dimensional space.

That is, for example, in the example indicated by an arrow Q11 in FIG. 1, an object OB11 and an object OB12 exist around a listener U11 in three-dimensional space.

Here, the object OB11 is, for example, an audio object having high dependence on the arrangement position in the space such as a musical instrument. In other words, the object OB11 is an object that should be localized at an absolute position in the space at the time of audio reproduction. An object of a direct sound of a musical instrument or the like is also referred to as a dry object.

Hereinafter, an object having high dependence on the arrangement position in the space, such as the object OB11, is also referred to as an absolute coordinate object.

On the other hand, the object OB12 is an audio object having low positional dependence, that is, low dependence on the arrangement position in the space, such as a huge object in the background, a fixed object corresponding to ground noise or a reverberation component, for example.

In other words, for example, the object OB12 is an object in which sound always reaches the listener U11 from a relatively constant direction regardless of the position and movement of the listener U11 in the space during audio reproduction.

Hereinafter, an object having a low dependence on the arrangement position in the space, such as the object OB12, is also referred to as a polar coordinate object.

In the free viewpoint, for example, as indicated by an arrow Q12, since an object such as the object OB11 has high dependence on the arrangement position in the space, it is considered advantageous to transmit absolute coordinate position information from the viewpoint of transmission efficiency.

This is because, for example, in the case of transmitting absolute coordinate position information of the object OB11, once the absolute coordinate position information is transmitted, if the object OB11 remains stationary even if the position of the listener U11 changes, it is not necessary to transmit absolute coordinate position information.

On the other hand, an object of background sound surrounding the listener U11, such as the object OB12, has low dependence on the position in the space, and is preferably regarded as an object arranged around the listener U11.

As described above, in a case where absolute coordinate position information of an object is transmitted with accuracy corresponding to the distance from the listener, mapping to the absolute coordinate position corresponding to an arbitrary position of the listener for maintaining the positional relationship with the listener as the center needs to be performed in real time, which causes inconvenience in terms of control and arithmetic processing. That is, it is necessary to perform control such as determining the quantization accuracy on the basis of the distance from the listener and arithmetic processing.

Additionally, in a case where the size of the space is large, it is necessary to arrange more objects having low position dependence such as ground noise to cover the area, for example. As a result, the increase in the number of objects to be transmitted may increase information to be transmitted.

Hence, in the present technology, for an object such as the object OB12 having a low dependence on the arrangement position, the position is not expressed by absolute coordinates, but polar coordinate position information expressing a position in a polar coordinate system centered on the listener U11 is transmitted as indicated by an arrow Q13.

In this case, polar coordinate position information including an azimuth angle and an elevation angle indicating positions in the horizontal direction and the vertical direction of the object OB12 viewed from the listener U11 and a radius indicating a distance from the listener U11 to the object OB12 is generated.

If the polar coordinate position information is transmitted as the position information of the object having a low dependence on the arrangement position, it is not necessary to perform mapping to the absolute coordinate position, and the processing amount of data processing (arithmetic processing) can be reduced (processing efficiency can be improved). Moreover, for some objects, polar coordinate position information does not change even when the position of the listener U11 changes. Hence, the number of times of transmission of the polar coordinate position information can be reduced and the transmission efficiency can be improved.

As described above, by combining absolute coordinate position information and polar coordinate position information according to the nature (role) of the object, position information can be transmitted efficiently.

Note that as the application of the polar coordinate object, a sound effect centered on the listener and the like are also conceivable, similarly to the above-described ground noise and reverberant sound. In such a case, too, it is possible to achieve efficient transmission of position information by expressing the position of the object by polar coordinates.

Additionally, for a polar coordinate object, gain information may be coded and transmitted to the client together with the polar coordinate position information.

In such a case, polar coordinate objects can be classified into the following categories C1 to C3, and the amount of information can be efficiently controlled by performing such category classification. Here, the angle indicating the position is an azimuth angle and an elevation angle.

Category C1: Both the angle indicating the position and the gain information are fixed Category C2: The angle indicating the position is fixed, but the gain information is variable Category C3: Both the angle indicating the position and the gain information are variable For example, a polar coordinate object such as ground noise is in Category C1, a polar coordinate object such as reverberant sound whose gain changes in conjunction with the position of the listener is in Category C2, and a polar coordinate object such as a sound effect is in Category C3.

For example, a predetermined fixed coordinate value (fixed value) is used as the polar coordinate position information for a polar coordinate object of Category C1 or Category C2. Hence, once the polar coordinate position information is transmitted to the client, the polar coordinate position information does not need to be transmitted thereafter.

Accordingly, not only the number of times of transmission of the polar coordinate position information can be reduced and transmission efficiency can be improved, but also the bit stream code amount can be reduced.

In particular, for a polar coordinate object of Category C1, not only the polar coordinate position information but also the gain information has a fixed value. Hence, transmission efficiency can be improved and the code amount can be reduced by the gain information as well.

Additionally, for example, for a polar coordinate object of Category C2, the server side may calculate the gain amount according to the listener position information acquired from the client, code the gain information indicating the gain amount, and transmit the gain information to the client.

Here, FIG. 2 illustrates an example of a bit stream format for transmitting the position information of the object described above.

In FIG. 2, "NumOfObjects" indicates the total number of absolute coordinate objects and polar coordinate objects, that is, the total number of objects.

Additionally, "PosCodingMode [i]" indicates a position coding mode of the i-th object, that is, the type of the object, and position information, gain information, and the like of the object are stored in the bit stream according to the value of the position coding mode.

Here, the value "0" of the position coding mode indicates an absolute coordinate object. Additionally, the value "1" of the position coding mode indicates a polar coordinate object of Category C1, and fixed polar coordinate position information and gain information prepared in advance are transmitted for this polar coordinate object.

Moreover, the value "2" of the position coding mode indicates a polar coordinate object of Category C2, and fixed polar coordinate position information prepared in advance and variable gain information are transmitted for this polar coordinate object.

The value "3" of the position coding mode indicates a polar coordinate object of Category C3, and variable polar coordinate position information and gain information are transmitted for this polar coordinate object.

In this example, the polar coordinate position information and the absolute coordinate position information are stored in different areas and transmitted. In particular, the absolute coordinate position information is stored in an extension area or the like of the bit stream and transmitted, as illustrated in FIG. 2.

That is, in this example, for the object whose value of the position coding mode is 0, the quantization bit depth "ChildCubeDivIndex [i]", the x coordinate value "QposX [i]" included in the absolute coordinate position information, the y coordinate value "QposY [i]" included in the absolute coordinate position information, and the z coordinate value "QposZ [i]" included in the absolute coordinate position information are coded and stored in the extension area or the like.

Note that the transmission of polar coordinate position information and absolute coordinate position information is not limited to the example described with reference to FIG. 2, and may be performed in any manner.

Figure 3:
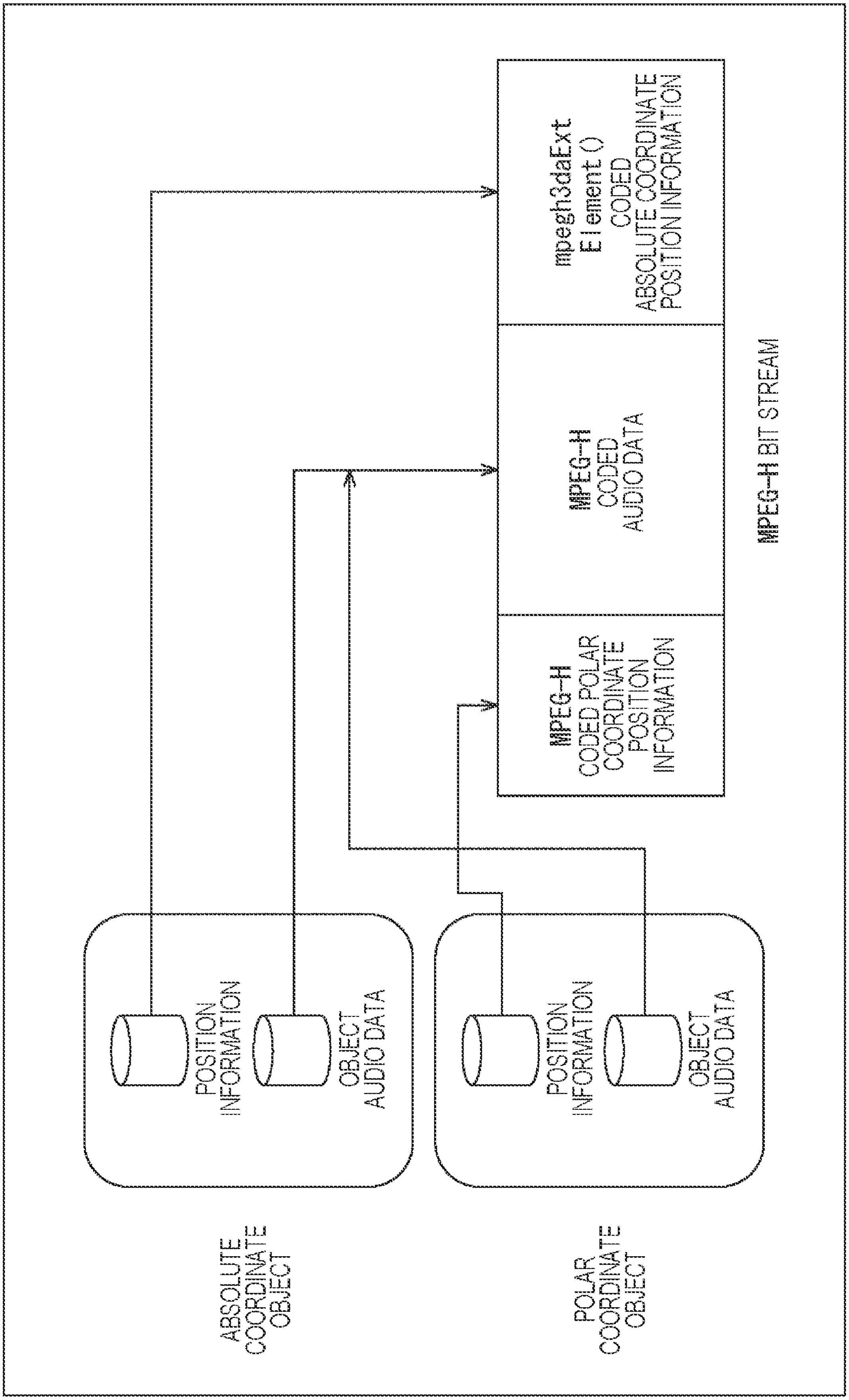
FIG. 3 is a diagram illustrating a bit stream configuration example.

For example, for the polar coordinate position information, an existing coding system such as MPEG-H may be used. In such a case, for example, as illustrated in FIG. 3, for the audio data of the object, both the part of the polar coordinate object and the part of the absolute coordinate object are coded.

Then, the coded audio data obtained by coding the audio data of the polar coordinate object is stored in a channel pair element (CPE) or a single channel element (SCE) of the bit stream as data with position information.

Additionally, polar coordinate position information of the polar coordinate object is coded and stored in a metadata region of the bit stream or the like.

On the other hand, the coded audio data obtained by coding the audio data of the absolute coordinate object is stored in the CPE or SCE of the bit stream as data without position information.

Moreover, absolute coordinate position information of the absolute coordinate object is stored in, for example, "mpegh3daExtElement ( )" which is an extension region of the MPEG-H coding standard in the format illustrated in FIG. 2, or transmitted as a format different from MPEG-H.

<Configuration Example of Server>

Next, a content reproduction system to which the present technology is applied will be described.

For example, the content reproduction system includes the above-described server and client. In the content reproduction system, an object to be an absolute coordinate object and an object to be a polar coordinate object are determined in advance.

Figure 4:
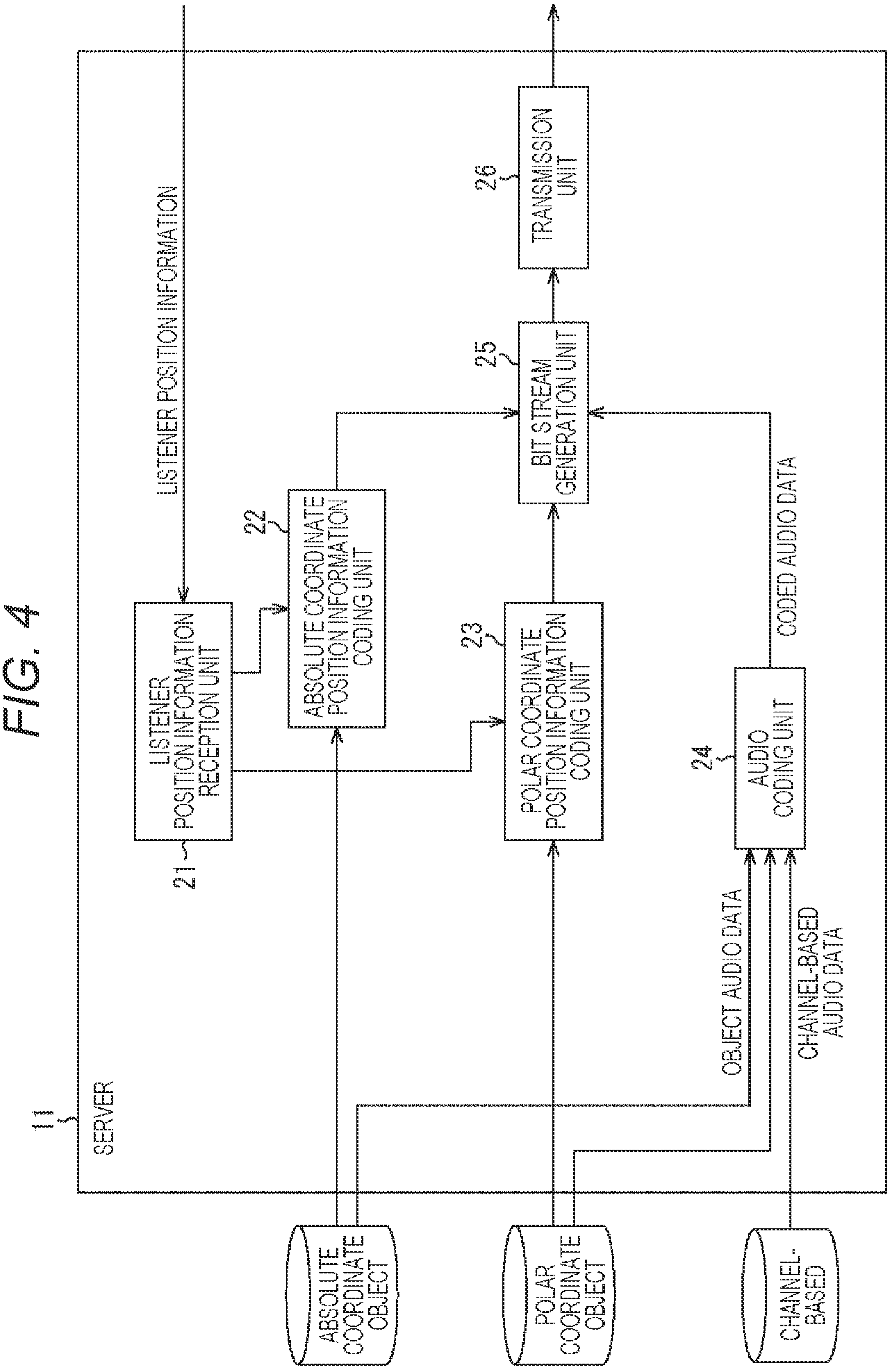
FIG. 4 is a diagram illustrating a configuration example of a server.

The server included in the content reproduction system is configured as illustrated in FIG. 4, for example.

A server 11 illustrated in FIG. 4 includes a listener position information reception unit 21, an absolute coordinate position information coding unit 22, a polar coordinate position information coding unit 23, an audio coding unit 24, a bit stream generation unit 25, and a transmission unit 26.

The listener position information reception unit 21 receives listener position information indicating the position of the listener (user) in the space transmitted from the client through a communication network, and supplies the listener position information to the absolute coordinate position information coding unit 22 and the polar coordinate position information coding unit 23. Here, listener position information is absolute coordinates or the like indicating an absolute position of the listener in the space.

The absolute coordinate position information coding unit 22 generates and codes absolute coordinate position information indicating the absolute position of the absolute coordinate object in the space on the basis of the listener position information supplied from the listener position information reception unit 21, and supplies the absolute coordinate position information to the bit stream generation unit 25.

For example, the absolute coordinate position information coding unit 22 quantizes position information indicating the absolute position of the absolute coordinate object with quantization accuracy (quantization step size) determined by the distance from the listener to the absolute coordinate object, thereby generating coded absolute coordinate position information with accuracy corresponding to the positional relationship with the listener.

Additionally, for example, there may be a case where coded highest-accuracy absolute coordinate position information obtained by quantizing absolute coordinates of an absolute coordinate object with predetermined quantization accuracy is prepared in advance.

In such a case, the absolute coordinate position information coding unit 22 acquires the highest-accuracy absolute coordinate position information of the absolute coordinate object, and extracts information of a bit length determined for the distance from the listener to the absolute coordinate object from the highest-accuracy absolute coordinate position information. As a result, the coded absolute coordinate position information indicating the position of the absolute coordinate object with the accuracy determined with respect to the distance from the listener is obtained.

Alternatively, the absolute coordinate position information coding unit 22 may acquire or generate gain information of the absolute coordinate object, code the gain information, and supply the gain information to the bit stream generation unit 25.

The polar coordinate position information coding unit 23 generates, as necessary, polar coordinate position information indicating a relative position of a polar coordinate object viewed from the listener, and codes the polar coordinate position information.

For example, since polar coordinate position information is prepared in advance for polar coordinate objects of Category C1 and Category C2 described above, the polar coordinate position information coding unit 23 acquires and codes the polar coordinate position information prepared in advance.

Additionally, for example, for a polar coordinate object of Category C3, position information indicating the absolute position of the polar coordinate object in the space is prepared in advance.

Then, the polar coordinate position information coding unit 23 acquires position information indicating the absolute position of the polar coordinate object, and generates and codes polar coordinate position information on the basis of the position information and listener position information supplied from the listener position information reception unit 21.

Moreover, on the basis of the category of the polar coordinate object and the listener position information, the polar coordinate position information coding unit 23 appropriately generates gain information of the polar coordinate object or acquires gain information of the polar coordinate object prepared in advance, and codes the gain information.

The polar coordinate position information coding unit 23 supplies the coded polar coordinate position information and gain information to the bit stream generation unit 25.

Note that hereinafter, absolute coordinate position information that has been coded is also referred to as coded absolute coordinate position information, and polar coordinate position information that has been coded is also referred to as coded polar coordinate position information.

The audio coding unit 24 acquires audio data of an absolute coordinate object, audio data of a polar coordinate object, and channel-based audio data, codes the acquired audio data, and supplies the coded audio data obtained as a result to the bit stream generation unit 25.

Here, channel-based audio data is audio data of each channel of a multichannel configuration.

For example, channel-based audio data is audio data such as fixed ground noise or background sound does not change in the way it sounds whatever the position of the listener is. Additionally, audio data for reproducing a sound effect or the like that affects a wide range that is difficult to express by one or a plurality of objects, such as a blast spreading in the entire space, may be used as channel-based audio data.

On the other hand, audio data of an absolute coordinate object or a polar coordinate object is object-based audio data for reproducing the sound of an object.

Hereinafter, a case where a free viewpoint content reproduced on the client side includes a sound based on channel-based audio data, a sound of each absolute coordinate object, and a sound of each polar coordinate object will be described.

However, if the sound of each absolute coordinate object and the sound of each polar coordinate object are reproduced as the sound of the content, the channel-based audio data is not necessarily required.

As an example, in a case where there is audio data of a polar coordinate object as audio data of ground noise or the like, it is conceivable to not include channel-based audio data as content data.

Conversely, in a case where there is channel-based audio data as audio data of ground noise or the like, it is also conceivable to not include an object of ground noise or the like.

The bit stream generation unit 25 multiplexes the coded absolute coordinate position information from the absolute coordinate position information coding unit 22, the coded polar coordinate position information and the gain information from the polar coordinate position information coding unit 23, and the coded audio data from the audio coding unit 24. The bit stream generation unit 25 supplies the bit stream generated by multiplexing to the transmission unit 26.

The transmission unit 26 transmits the bit stream supplied from the bit stream generation unit 25 to the client through the communication network.

<Configuration Example of Client>

Figure 5:
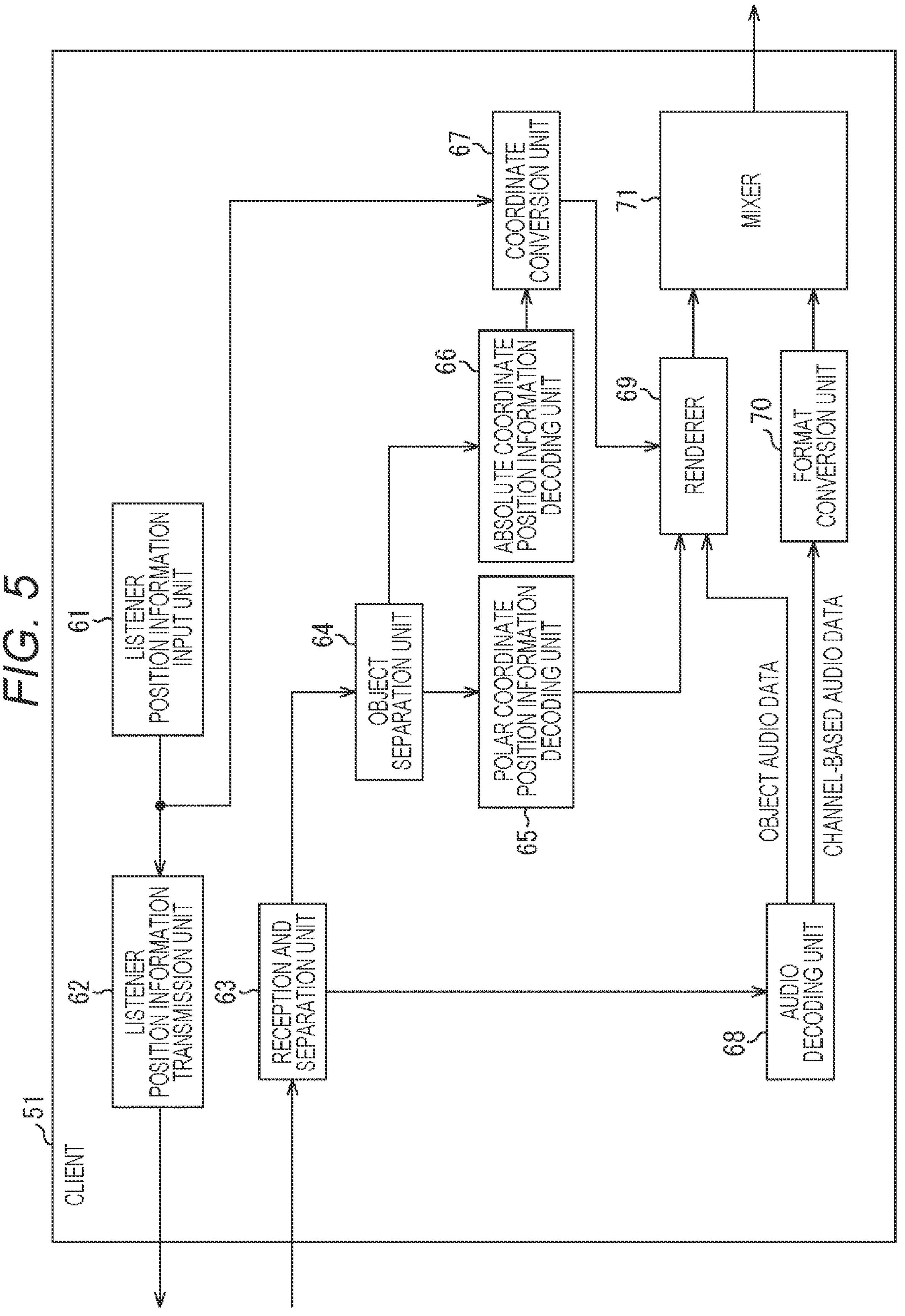
FIG. 5 is a diagram illustrating a configuration example of a client.

Additionally, the client that receives the supply of the bit stream from the server 11 is configured as illustrated in FIG. 5, for example.

A client 51 illustrated in FIG. 5 includes a listener position information input unit 61, a listener position information transmission unit 62, a reception and separation unit 63, an object separation unit 64, a polar coordinate position information decoding unit 65, an absolute coordinate position information decoding unit 66, a coordinate conversion unit 67, an audio decoding unit 68, a renderer 69, a format conversion unit 70, and a mixer 71.

The listener position information input unit 61 includes, for example, a sensor mounted on the listener, a mouse, a keyboard, a touch panel, and the like, and supplies the listener position information input (designated) by the action, operation, or the like of the listener to the listener position information transmission unit 62 and the coordinate conversion unit 67.

The listener position information transmission unit 62 transmits the listener position information supplied from the listener position information input unit 61 to the server 11 through the communication network.

The reception and separation unit 63 receives a bit stream transmitted from the server 11, and separates coded absolute coordinate position information, coded polar coordinate position information, gain information, and coded audio data from the bit stream.

In other words, the reception and separation unit 63 functions as an acquisition unit that acquires coded absolute coordinate position information, coded polar coordinate position information, gain information, and coded audio data by receiving a bit stream on the basis of listener position information. In particular, the reception and separation unit 63 acquires coded absolute coordinate position information of accuracy corresponding to the positional relationship between the listener and an absolute coordinate object on the basis of listener position information.

The reception and separation unit 63 supplies the coded absolute coordinate position information, the coded polar coordinate position information, and the gain information separated (extracted) from the bit stream to the object separation unit 64, and supplies the coded audio data to the audio decoding unit 68.

The object separation unit 64 separates the coded absolute coordinate position information, the coded polar coordinate position information, and the gain information supplied from the reception and separation unit 63.

That is, the object separation unit 64 supplies the coded polar coordinate position information and the gain information to the polar coordinate position information decoding unit 65, and supplies the coded absolute coordinate position information to the absolute coordinate position information decoding unit 66.

The polar coordinate position information decoding unit 65 decodes the coded polar coordinate position information and the gain information supplied from the object separation unit 64, and supplies the decoded information to the renderer 69.

The absolute coordinate position information decoding unit 66 decodes the coded absolute coordinate position information supplied from the object separation unit 64, and supplies the decoded information to the coordinate conversion unit 67.

On the basis of the listener position information supplied from the listener position information input unit 61, the coordinate conversion unit 67 converts the absolute coordinate position information supplied from the absolute coordinate position information decoding unit 66 into polar coordinate position information, and supplies the polar coordinate position information to the renderer 69.

By the coordinate conversion, the coordinate conversion unit 67 converts the absolute coordinate position information of the absolute coordinate object into polar coordinate position information that is polar coordinates indicating a relative position of the absolute coordinate object viewed from the listener position indicated by the listener position information.

Note that in the coordinate conversion, not only the listener position information but also direction information indicating the direction of the face of the listener obtained by the listener position information input unit 61 may be used. In such a case, polar coordinate position information indicating a relative position of the absolute coordinate object based on the front direction of the listener is generated.

The audio decoding unit 68 decodes coded audio data supplied from the reception and separation unit 63, supplies the resultant audio data of each object to the renderer 69, and supplies the channel-based audio data to the format conversion unit 70.

Accordingly, audio data of each absolute coordinate object and audio data of each polar coordinate object are supplied to the renderer 69.

The renderer 69 performs rendering processing on the basis of the polar coordinate position information and the gain information supplied from the polar coordinate position information decoding unit 65, the polar coordinate position information supplied from the coordinate conversion unit 67, and the audio data of each object supplied from the audio decoding unit 68.

The renderer 69 performs rendering processing in a polar coordinate system defined by MPEG-H, for example.

More specifically, for example, the renderer 69 performs vector based amplitude panning (VBAP) or the like as rendering processing, and generates audio data for reproducing the sound of the object.

The audio data is multichannel audio data corresponding to the speaker configuration of the speaker system as the final output destination. That is, the audio data obtained by the rendering processing includes audio data of channels corresponding to a plurality of speakers included in the speaker system.

By reproducing sound on the basis of such audio data, a sound image of an object can be localized at a position indicated by polar coordinate position information in the space.

Note that the renderer 69 performs gain correction on audio data of a polar coordinate object on the basis of gain information of the polar coordinate object, and performs rendering processing using the gain-corrected audio data.

The renderer 69 supplies the audio data obtained by the rendering processing to the mixer 71.

The format conversion unit 70 performs format conversion of converting the channel-based audio data supplied from the audio decoding unit 68 into audio data having a channel configuration corresponding to the speaker configuration of the speaker system for reproducing the sound of the content.

The format conversion unit 70 supplies the channel-based audio data obtained by the format conversion to the mixer 71.

The mixer 71 performs mixing processing on the basis of the audio data supplied from the renderer 69 and the channel-based audio data supplied from the format conversion unit 70, and outputs the multichannel audio data obtained as a result to the subsequent stage.

For example, in the mixing processing, audio data of the same channel in the multichannel audio data supplied from the renderer 69 and the channel-based audio data is added (mixed) to obtain the final audio data of the channel.

<Description of Transmission Processing and Reception Processing>

Next, an operation of the content reproduction system including the server 11 and the client 51 will be described. That is, hereinafter, transmission processing by the server 11 and reception processing by the client 51 will be described with reference to the flowchart of FIG. 6.

When an instruction on the start of reproduction of the content is given in the client 51, the client 51 starts the reception processing. When the reception processing is started, the listener position information input unit 61 supplies listener position information input (designated) by an operation of the listener or the like to the listener position information transmission unit 62 and the coordinate conversion unit 67.

Then, in step S11, the listener position information transmission unit 62 transmits the listener position information supplied from the listener position information input unit 61 to the server 11.

Note that the listener position information may be transmitted periodically, such as for each frame, or may be transmitted only when the position of the listener changes.

When the listener position information is transmitted in this manner, the server 11 performs the transmission processing.

That is, in step S41, the listener position information reception unit 21 receives the listener position information transmitted from the client 51, and supplies the listener position information to the absolute coordinate position information coding unit 22 and the polar coordinate position information coding unit 23.

In step S42, the absolute coordinate position information coding unit 22 generates absolute coordinate position information of an absolute coordinate object on the basis of the listener position information supplied from the listener position information reception unit 21. Additionally, in step S43, the absolute coordinate position information coding unit 22 codes the absolute coordinate position information on the basis of the listener position information, and supplies the obtained coded absolute coordinate position information to the bit stream generation unit 25.

For example, the absolute coordinate position information coding unit 22 acquires position information indicating the absolute position of the absolute coordinate object, and quantizes the position information with quantization accuracy determined by the listener position information, thereby generating coded absolute coordinate position information with accuracy corresponding to the positional relationship with the listener.

Additionally, for example, in a case where coded absolute coordinate position information with the highest accuracy is prepared in advance, the absolute coordinate position information coding unit 22 acquires the highest-accuracy absolute coordinate position information.

Then, the absolute coordinate position information coding unit 22 extracts information of a bit length determined for the distance from the listener to the absolute coordinate object from the acquired highest-accuracy absolute coordinate position information, thereby generating coded absolute coordinate position information with predetermined quantization accuracy.

At this time, in view of the allowable quantization error due to the human perception angle and the distance to the object, for example, the coded absolute coordinate position information with lower quantization accuracy is generated for an absolute coordinate object with a longer distance from the listener, whereby transmission efficiency of the coded absolute coordinate position information can be improved without impairing the localization feeling of the sound image.

In step S44, the polar coordinate position information coding unit 23 generates necessary polar coordinate position information of a polar coordinate object according to the listener position information supplied from the listener position information reception unit 21. That is, the polar coordinate position information coding unit 23 acquires position information of the polar coordinate object, and generates polar coordinate position information of the polar coordinate object on the basis of the acquired position information and the listener position information.

Here, since the polar coordinate position information of Category C1 and Category C2 is obtained in advance, only the polar coordinate position information of Category C3 is generated.

Additionally, the polar coordinate position information coding unit 23 acquires gain information of the polar coordinate object of Category C1, and generates the gain information of the polar coordinate objects of Category C2 and Category C3 on the basis of the position information of the polar coordinate objects and the listener position information.

In step S45, the polar coordinate position information coding unit 23 codes the polar coordinate position information and the gain information of each polar coordinate object, and supplies the coded information to the bit stream generation unit 25.

In step S46, the audio coding unit 24 acquires audio data of the absolute coordinate object, audio data of the polar coordinate object, and channel-based audio data, and codes the pieces of audio data.

The audio coding unit 24 supplies the coded audio data obtained by the coding to the bit stream generation unit 25.

In step S47, the bit stream generation unit 25 multiplexes the coded absolute coordinate position information from the absolute coordinate position information coding unit 22, the coded polar coordinate position information and the gain information from the polar coordinate position information coding unit 23, and the coded audio data from the audio coding unit 24 to generate a bit stream. The bit stream generation unit 25 supplies the bit stream generated by multiplexing to the transmission unit 26.

Note that, for example, in a case where the same coded absolute coordinate position information has already been transmitted, such as a case where the position of the absolute coordinate object and the distance from the listener to the absolute coordinate object have not changed, 0 is transmitted as the quantization bit depth for the absolute coordinate object, so that the coded absolute coordinate position information is not stored in the bit stream. That is, the absolute coordinate position information is neither coded nor transmitted to the client 51.

Similarly, the coded polar coordinate position information is coded and transmitted to the client 51 only when the polar coordinate position information changes.

In this way, transmission efficiency of the coded absolute coordinate position information and the coded polar coordinate position information can be improved.

In step S48, the transmission unit 26 transmits the bit stream supplied from the bit stream generation unit 25 to the client 51, and the transmission processing ends.

Additionally, when the bit stream is transmitted, the client 51 performs processing of step S12.

That is, in step S12, the reception and separation unit 63 receives the bit stream transmitted from the server 11.

In step S13, the reception and separation unit 63 separates the received bit stream into coded absolute coordinate position information, coded polar coordinate position information, gain information, and coded audio data.

The reception and separation unit 63 supplies the separated coded absolute coordinate position information, coded polar coordinate position information, and gain information to the object separation unit 64, and supplies the coded audio data to the audio decoding unit 68.

Additionally, the object separation unit 64 supplies the coded polar coordinate position information and the gain information supplied from the reception and separation unit 63 to the polar coordinate position information decoding unit 65, and supplies the coded absolute coordinate position information to the absolute coordinate position information decoding unit 66.

In step S14, the polar coordinate position information decoding unit 65 decodes the coded polar coordinate position information and the gain information supplied from the object separation unit 64, and supplies the decoded information to the renderer 69.

Note that, here, an example has been described in which the gain information of the polar coordinate objects of Category C2 and Category C3 is calculated on the server 11 side.

However, the polar coordinate position information decoding unit 65 may calculate the gain information of the polar coordinate objects of Category C2 and Category C3 on the basis of the listener position information and the polar coordinate position information. In this case, the category (type) of each polar coordinate object can be identified from the position coding mode included in the bit stream.

In step S15, the absolute coordinate position information decoding unit 66 decodes the coded absolute coordinate position information supplied from the object separation unit 64, and supplies the coded absolute coordinate position information to the coordinate conversion unit 67.

In step S16, the coordinate conversion unit 67 performs coordinate conversion on the absolute coordinate position information supplied from the absolute coordinate position information decoding unit 66 on the basis of the listener position information supplied from the listener position information input unit 61. As a result, for each absolute coordinate object, polar coordinate position information indicating a relative position of the absolute coordinate object viewed from the listener is obtained.

Note that in the coordinate conversion, information indicating the direction of the face (yaw), the face raising/lowering (pitch), and the face rotation (roll) of the listener may also be used.

The coordinate conversion unit 67 supplies the polar coordinate position information of each absolute coordinate object obtained by the coordinate conversion to the renderer 69.

In step S17, the audio decoding unit 68 decodes the coded audio data supplied from the reception and separation unit 63.

The audio decoding unit 68 supplies the audio data of each absolute coordinate object and the audio data of each polar coordinate object obtained by decoding to the renderer 69, and supplies the channel-based audio data obtained by decoding to the format conversion unit 70.

Additionally, the format conversion unit 70 performs format conversion on the channel-based audio data supplied from the audio decoding unit 68, and supplies the resultant audio data to the mixer 71.

In step S18, the renderer 69 performs rendering processing such as VBAP on the basis of the polar coordinate position information supplied from the polar coordinate position information decoding unit 65, the polar coordinate position information supplied from the coordinate conversion unit 67, and the audio data supplied from the audio decoding unit 68.

At this time, the renderer 69 performs gain correction on the audio data of the polar coordinate object on the basis of the gain information supplied from the polar coordinate position information decoding unit 65, and performs rendering processing using the gain-corrected audio data. The renderer 69 supplies the audio data obtained by the rendering processing to the mixer 71.

In step S19, the mixer 71 performs mixing processing on the basis of the audio data supplied from the renderer 69 and the channel-based audio data supplied from the format conversion unit 70.

Then, the mixer 71 outputs the multichannel audio data obtained by the mixing processing to the subsequent stage, and the reception processing ends.

Note that in a case where channel-based audio data is not included in the bit stream, the mixing processing is not performed, the audio data obtained by the renderer 69 is output to the subsequent stage, and the reception processing ends.

In the content reproduction system, the processing described above is performed for each frame of the audio data of the content.

As described above, the server 11 codes the absolute coordinate position information or the polar coordinate position information according to whether the object is an absolute coordinate object or a polar coordinate object, stores the information in a bit stream together with the coded audio data, and transmits the information.

Additionally, the client 51 extracts and decodes the coded absolute coordinate position information and the coded polar coordinate position information from the bit stream, and performs rendering processing.

As described above, by generating the absolute coordinate position information and the polar coordinate position information indicating the position of the object in the coordinate system according to the property (feature) of the object and transmitting the information to the client 51, the information amount and the transmission frequency of the position information of the object can be reduced, and transmission efficiency can be improved.

Second Embodiment

<Configuration Example of Server>

Note that, for example, a polar coordinate object of Category C1 such as ground noise may be transmitted to the client 51 as channel-based audio data instead of audio data of an object.

Figure 7:
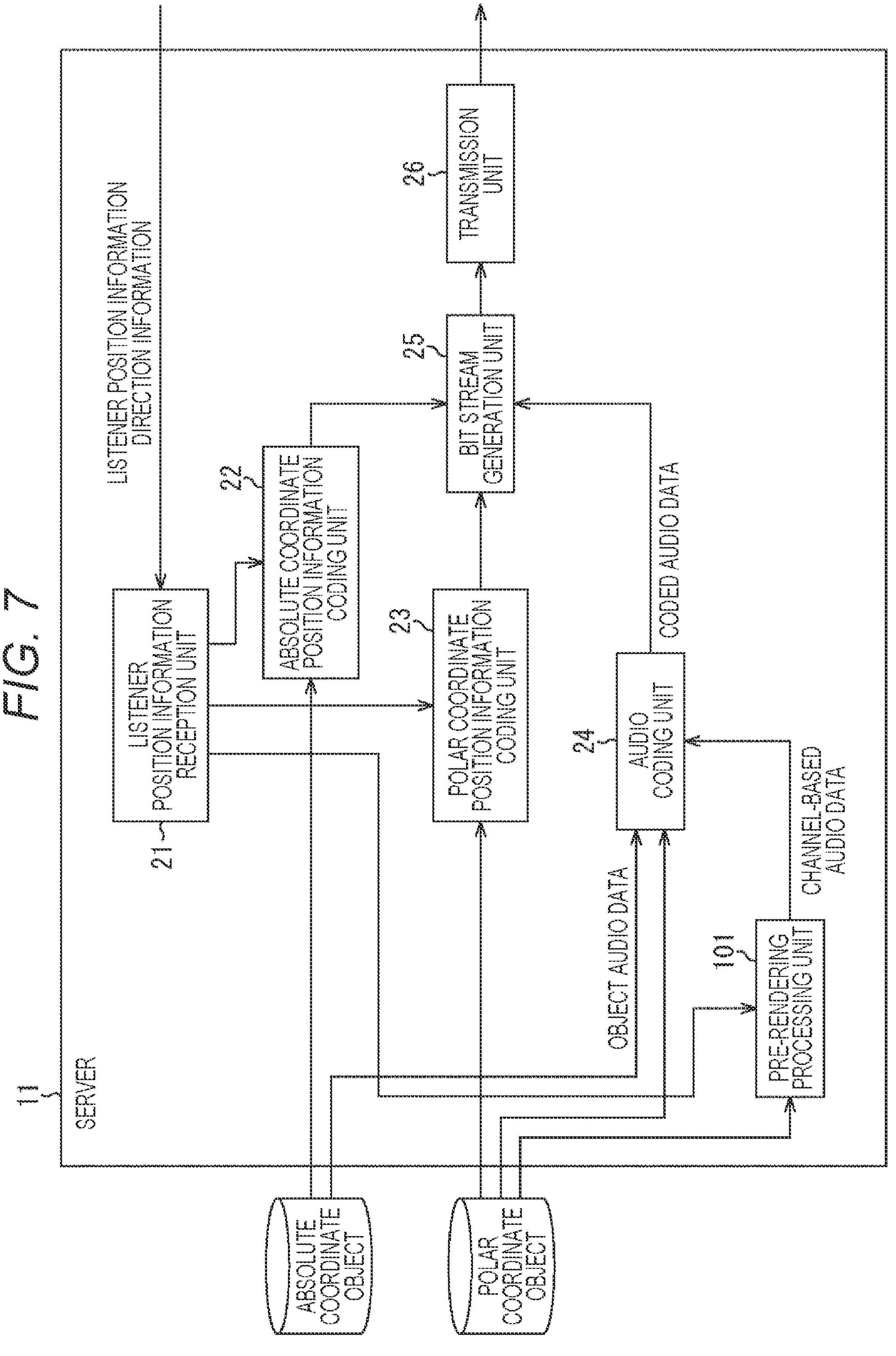
FIG. 7 is a diagram illustrating a configuration example of a server.

In such a case, a content reproduction system includes, for example, a server 11 illustrated in FIG. 7 and a client 51 illustrated in FIG. 5. Note that in FIG. 7, the same reference numerals are given to the parts corresponding to those in FIG. 4, and the description thereof will be omitted as appropriate.

The server 11 illustrated in FIG. 7 includes a listener position information reception unit 21, an absolute coordinate position information coding unit 22, a polar coordinate position information coding unit 23, a pre-rendering processing unit 101, an audio coding unit 24, a bit stream generation unit 25, and a transmission unit 26.

The configuration of the server 11 in FIG. 7 is different from that of the server 11 in FIG. 4 in that the pre-rendering processing unit 101 is newly provided, and is the same as that of the server 11 in FIG. 4 in other points.

Note, however, that in the server 11 of FIG. 7, the listener position information reception unit 21 acquires not only listener position information but also direction information indicating the direction of the face of the listener from the client 51, and supplies the direction information to the pre-rendering processing unit 101.

Additionally, in this example, assume that position information indicating the absolute position of a polar coordinate object in the space is prepared in advance for a polar coordinate object of Category C1.

The pre-rendering processing unit 101 acquires position information indicating the absolute position and audio data of the polar coordinate object of Category C1.

Moreover, the pre-rendering processing unit 101 performs pre-rendering on the basis of the acquired position information and audio data, and the listener position information and the direction information supplied from the listener position information reception unit 21, and supplies channel-based audio data obtained as a result to the audio coding unit 24.

For example, in pre-rendering, first, polar coordinate position information indicating a relative position of the polar coordinate object based on the front direction of the listener is generated on the basis of the position information of the polar coordinate object, the listener position information, and the direction information.

Then, VBAP or the like is performed on the basis of the polar coordinate position information and the audio data of the polar coordinate object, and channel-based audio data is generated. Channel-based audio data is audio data having a multi-channel configuration in which a sound image of a polar coordinate object is localized at a position indicated by polar coordinate position information in the space.

Note that in a case where there is other channel-based audio data prepared in advance included in the content, separately from the channel-based audio data generated by the pre-rendering, the other channel-based audio data is added to obtain the final channel-based audio data.

Object-based audio data has an advantage that sound image localization and gain control can be performed for an arbitrary object.

On the other hand, channel-based audio data has an advantage that it is not necessary to code and transmit position information of the object to the decoding side.

Accordingly, in the example of FIG. 7, it is not necessary to transmit coded polar coordinate position information of the polar coordinate object of Category C1 to the client 51, and the code amount of the bit stream can also be reduced. Moreover, since the client 51 side does not need to perform rendering processing of the polar coordinate object of Category C1, the processing amount in the client 51 can be reduced accordingly.

<Description of Transmission Processing and Reception Processing>

Next, an operation of the content reproduction system including the server 11 illustrated in FIG. 7 and the client 51 illustrated in FIG. 5 will be described.

Figure 8:
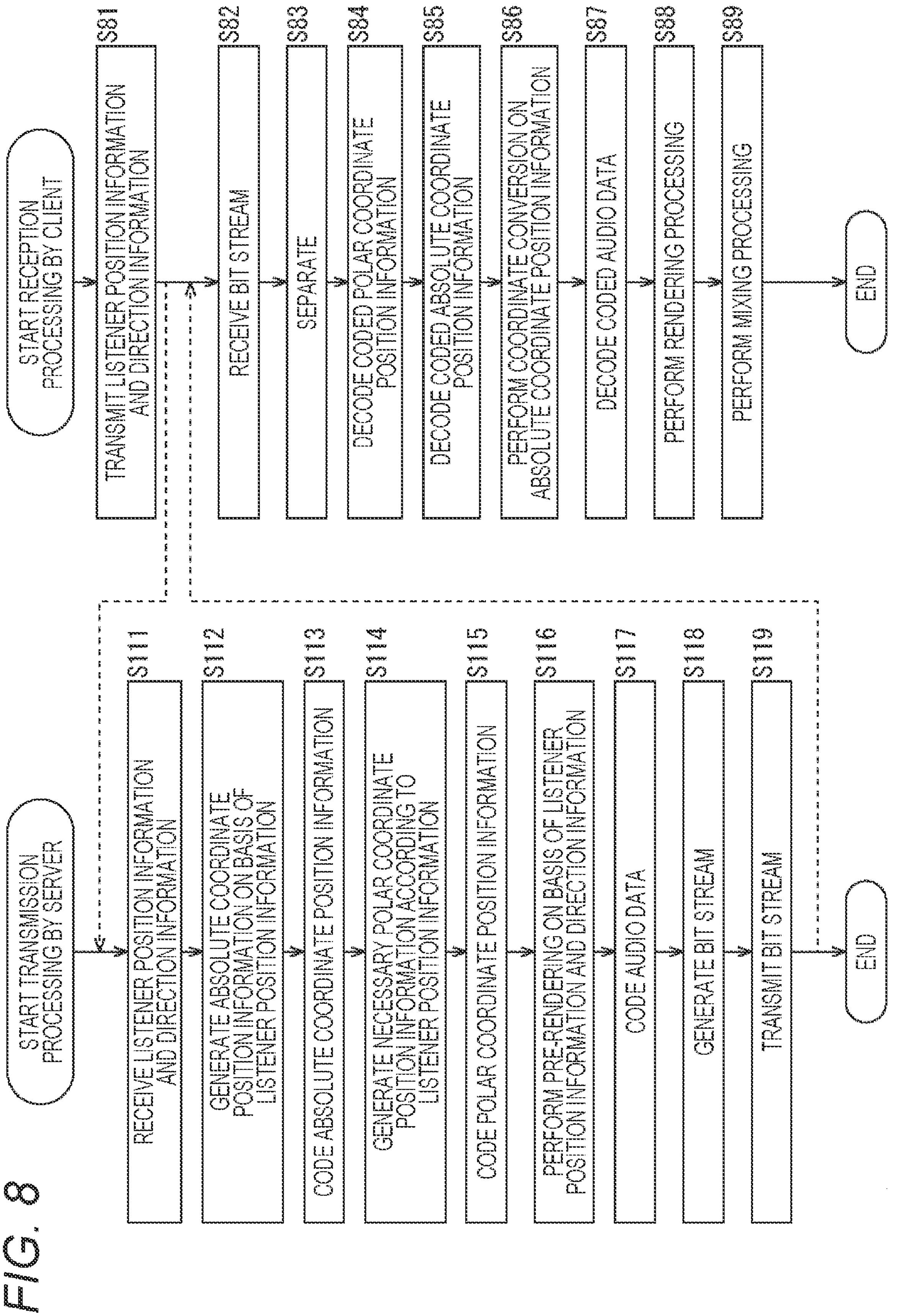
FIG. 8 is a flowchart illustrating transmission processing and reception processing.

That is, hereinafter, transmission processing by the server 11 and reception processing by the client 51 will be described with reference to the flowchart of FIG. 8.

When the reception processing is started in the client 51, the listener position information input unit 61 acquires listener position information and direction information, and supplies the listener position information and the direction information to the listener position information transmission unit 62 and the coordinate conversion unit 67.

Then, in step S81, the listener position information transmission unit 62 transmits the listener position information and the direction information supplied from the listener position information input unit 61 to the server 11.

When the listener position information and the direction information are transmitted in this manner, the server 11 performs the transmission processing.

That is, in step S111, the listener position information reception unit 21 receives the listener position information and the direction information transmitted from the client 51.

Additionally, the listener position information reception unit 21 supplies the listener position information to the absolute coordinate position information coding unit 22 and the polar coordinate position information coding unit 23, and supplies the listener position information and the direction information to the pre-rendering processing unit 101.

After the processing of step S111 is performed, processing of steps S112 to S115 is performed. Since the processing is similar to the processing of steps S42 to S45 of FIG. 6, the description thereof will be omitted.

Note, however, that in step S115, only the polar coordinate position information and the gain information of the polar coordinate objects of Category C2 and Category C3 are coded.

In step S116, the pre-rendering processing unit 101 performs pre-rendering on the basis of the listener position information and the direction information supplied from the listener position information reception unit 21, and supplies the obtained channel-based audio data to the audio coding unit 24.

That is, for example, the pre-rendering processing unit 101 acquires position information indicating the absolute position and audio data of the polar coordinate object of Category C1.

Then, the pre-rendering processing unit 101 performs processing such as VBAP as pre-rendering on the basis of the acquired position information and audio data, and the listener position information and the direction information, and generates channel-based audio data.

After the pre-rendering is performed, the processing of steps S117 to S119 is performed and the transmission processing ends. Since this processing is similar to the processing of steps S46 to S48 of FIG. 6, the description thereof will be omitted.

Note, however, that in step S117, the audio coding unit 24 codes the audio data of the absolute coordinate object, the audio data of the polar coordinate objects of Category C2 and Category C3, and the channel-based audio data supplied from the pre-rendering processing unit 101.

When the processing of step S119 is performed and the bit stream is transmitted to the client 51, in the client 51, the processing of steps S82 to S89 is performed and the reception processing ends.

Figure 6:
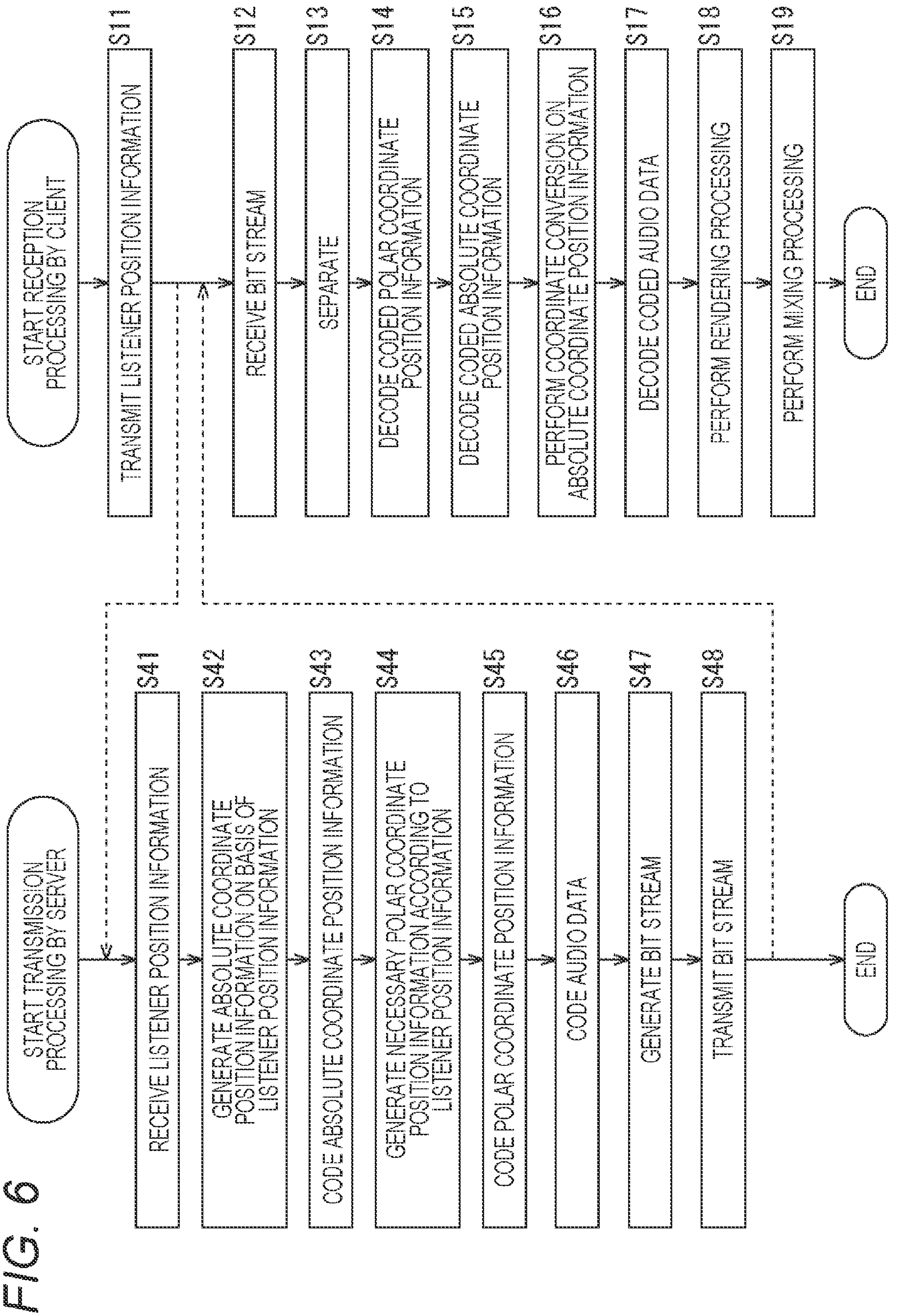
FIG. 6 is a flowchart illustrating transmission processing and reception processing.

Note that the processing of steps S82 to S89 is similar to the processing of steps S12 to S19 of FIG. 6, and the description thereof will be omitted. Note, however, that in step S86, coordinate conversion is performed using not only the listener position information but also the face direction information (yaw, pitch, roll).

As described above, the server 11 performs pre-rendering for polar coordinate objects of a specific category, and transmits channel-based audio data obtained as a result to the client 51. In this way, transmission efficiency can be improved.

Third Embodiment

<Configuration Example of Server>

Incidentally, ground noise, reverberant sound, and the like change depending on, for example, a virtual space such as a live venue where the sound of a content is reproduced.

Hence, for example, for a polar coordinate object that is an object such as ground noise or reverberant sound, a plurality of object groups may be prepared in advance, and the listener may select a desired object group from among these object groups.

In this case, an object group is prepared for each type of virtual space in which the content is reproduced, for example. Additionally, one object group includes one or a plurality of polar coordinate objects included in the content, and polar coordinate position information, gain information, and audio data are prepared for the polar coordinate objects.

Figure 9:
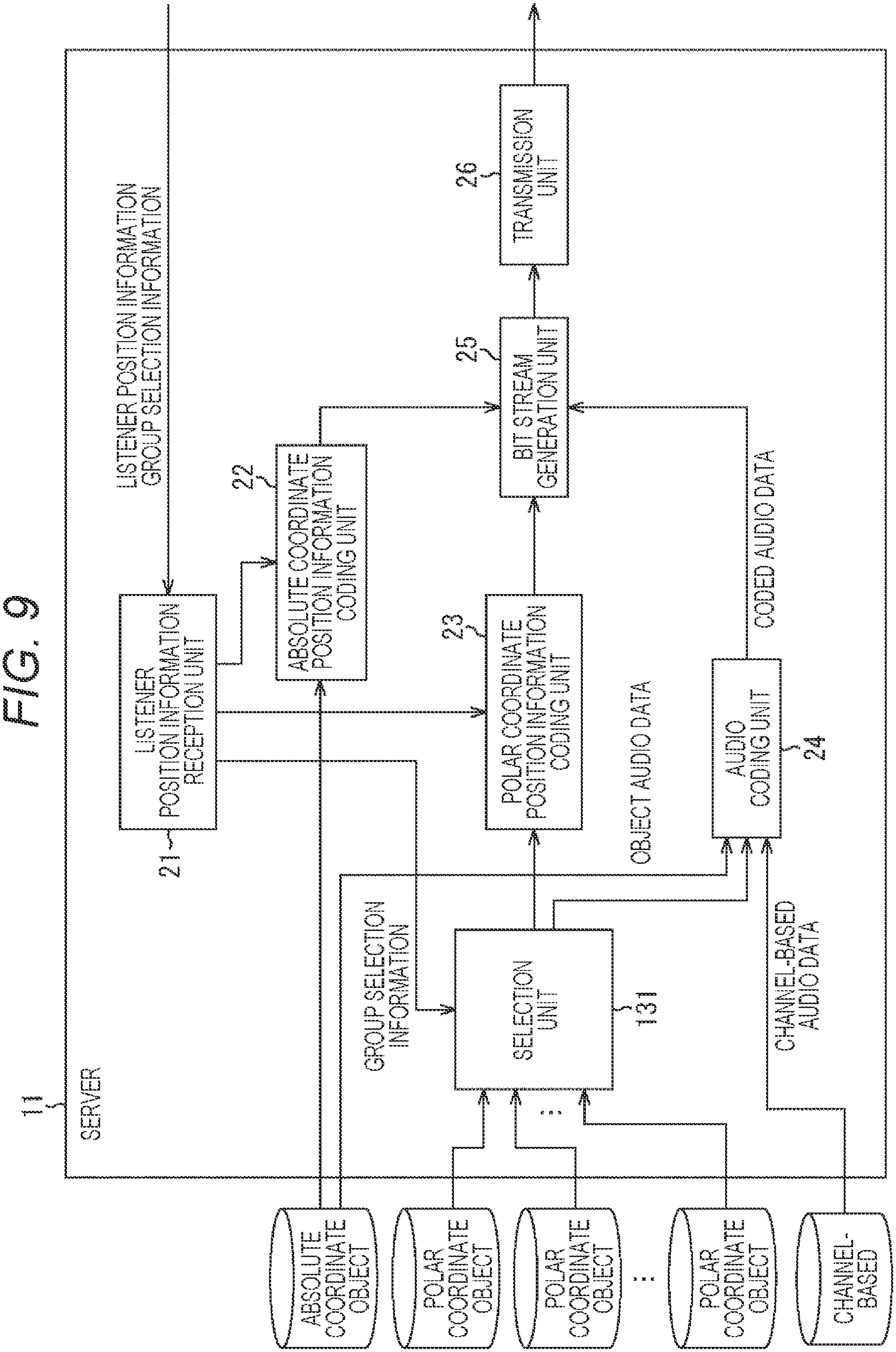
FIG. 9 is a diagram illustrating a configuration example of a server.

As described above, in a case where a plurality of object groups is prepared in advance, a content reproduction system includes, for example, a server 11 illustrated in FIG. 9 and a client 51 illustrated in FIG. 5. Note that in FIG. 9, the same reference numerals are given to the parts corresponding to those in FIG. 4, and the description thereof will be omitted as appropriate.

The server 11 illustrated in FIG. 9 includes a listener position information reception unit 21, an absolute coordinate position information coding unit 22, a selection unit 131, a polar coordinate position information coding unit 23, an audio coding unit 24, a bit stream generation unit 25, and a transmission unit 26.

The configuration of the server 11 in FIG. 9 is different from that of the server 11 in FIG. 4 in that the selection unit 131 is newly provided, and is the same as that of the server 11 in FIG. 4 in other points.

Note, however, that in the server 11 of FIG. 9, the listener position information reception unit 21 acquires not only the listener position information but also group selection information indicating the object group selected by the listener from the client 51, and supplies the group selection information to the selection unit 131.

Additionally, in this example, for each of a plurality of object groups, polar coordinate position information, gain information, and audio data of polar coordinate objects belonging to the object group are prepared.

The selection unit 131 selects an object group indicated by the group selection information supplied from the listener position information reception unit 21 from among the plurality of object groups.

Then, the selection unit 131 acquires the polar coordinate position information, the gain information, and the audio data prepared in advance for the polar coordinate object of the selected object group, and supplies them to the polar coordinate position information coding unit 23 and the audio coding unit 24.

<Description of Transmission Processing and Reception Processing>

Next, an operation of a content reproduction system including the server 11 illustrated in FIG. 9 and the client 51 illustrated in FIG. 5 will be described.

Figure 10:
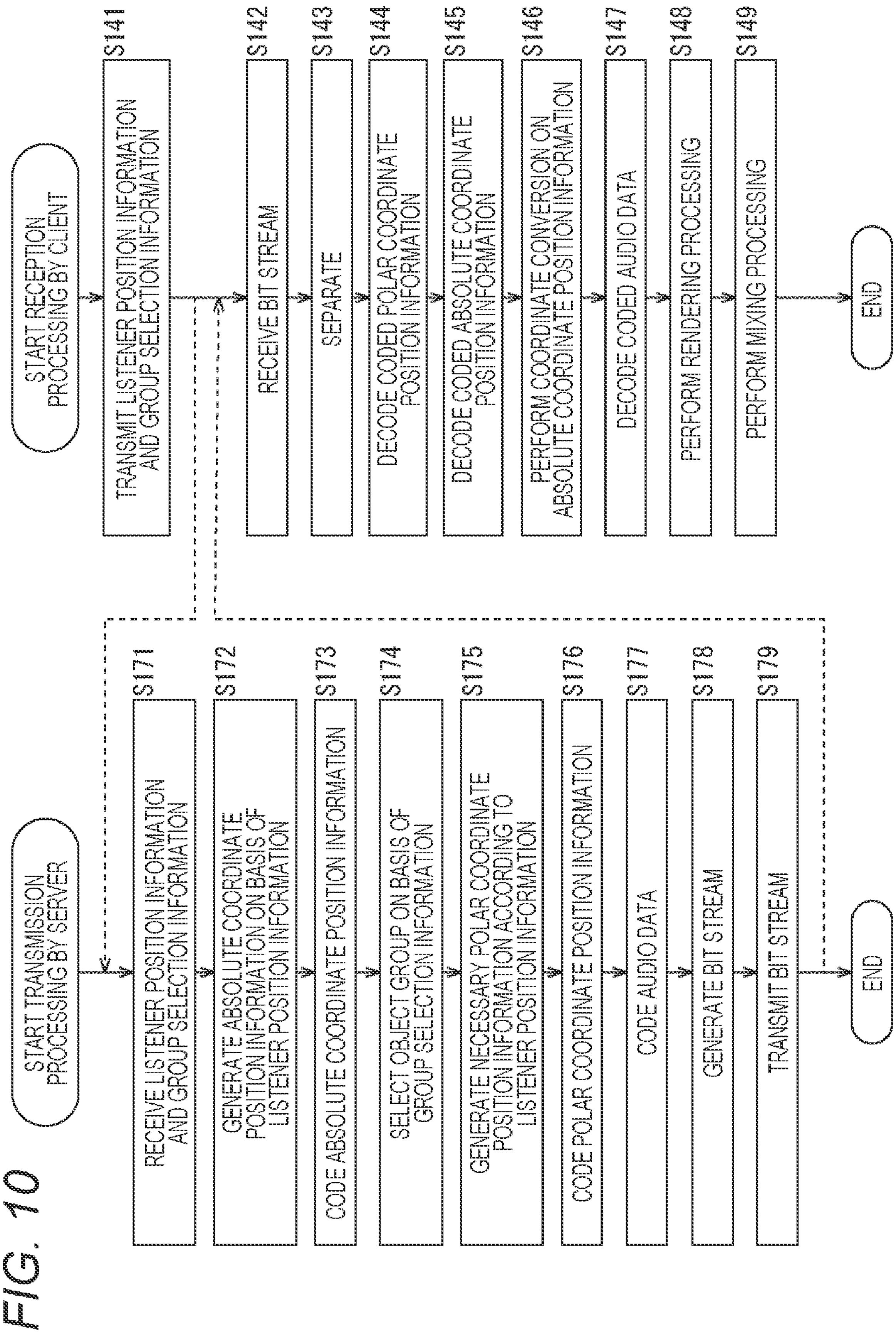
FIG. 10 is a flowchart illustrating transmission processing and reception processing.

That is, hereinafter, transmission processing by the server 11 and reception processing by the client 51 will be described with reference to the flowchart of FIG. 10.

When the reception processing is started in the client 51, the listener position information input unit 61 acquires listener position information and group selection information, and supplies the listener position information and the group selection information to the listener position information transmission unit 62. Additionally, the listener position information input unit 61 also supplies the listener position information to the coordinate conversion unit 67.

Then, in step S141, the listener position information transmission unit 62 transmits the listener position information and the group selection information supplied from the listener position information input unit 61 to the server 11.

Note that more specifically, the group selection information is transmitted to the server 11 only when the object group is designated by the listener. Additionally, the transmission timings of the listener position information and the group selection information may be the same or may be different.

When the listener position information and the group selection information are transmitted in this manner, the server 11 performs the transmission processing.

That is, in step S171, the listener position information reception unit 21 receives the listener position information and the group selection information transmitted from the client 51.

The listener position information reception unit 21 supplies the listener position information to the absolute coordinate position information coding unit 22 and the polar coordinate position information coding unit 23, and supplies the group selection information to the selection unit 131.

After the processing of step S171 is performed, the processing of steps S172 and S173 is performed. Since this processing is similar to the processing of steps S42 and S43 of FIG. 6, the description thereof will be omitted.

In step S174, the selection unit 131 selects an object group on the basis of the group selection information supplied from the listener position information reception unit 21.

The selection unit 131 acquires the polar coordinate position information and the gain information of the polar coordinate object of the selected object group, and supplies the polar coordinate position information and the gain information to the polar coordinate position information coding unit 23.

More specifically, the selection unit 131 acquires the polar coordinate position information and the gain information for a polar coordinate object of Category C1, and acquires only the polar coordinate position information for a polar coordinate object of Category C2.

Additionally, for a polar coordinate object of Category C3, the selection unit 131 acquires position information indicating an absolute position of the polar coordinate object in the space, and supplies the position information to the polar coordinate position information coding unit 23.

Moreover, the selection unit 131 acquires audio data of all polar coordinate objects of the selected object group, and supplies the audio data to the audio coding unit 24.

After the processing of step S174 is performed, the processing of steps S175 to S179 is performed and the transmission processing ends. Since this processing is similar to the processing of steps S44 to S48 of FIG. 6, the description thereof will be omitted.

When the processing of step S179 is performed and the bit stream is transmitted to the client 51, in the client 51, the processing of steps S142 to S149 is performed and the reception processing ends.

Note that the processing of steps S142 to S149 is similar to the processing of steps S12 to S19 of FIG. 6, and the description thereof will be omitted.

As described above, the server 11 selects an object group on the basis of the group selection information received from the client 51, and transmits the coded polar coordinate position information and the coded audio data of the polar coordinate object of the object group to the client 51.

In this way, the listener can select and reproduce one of a plurality of different ground noises and reverberant sounds that suits his/her taste. As a result, the satisfaction of the listener can be improved.

Fourth Embodiment

<Configuration Example of Client>

Note that audio data of a polar coordinate object may be prepared in advance for each of a plurality of object groups on the client 51 side.

Figure 11:
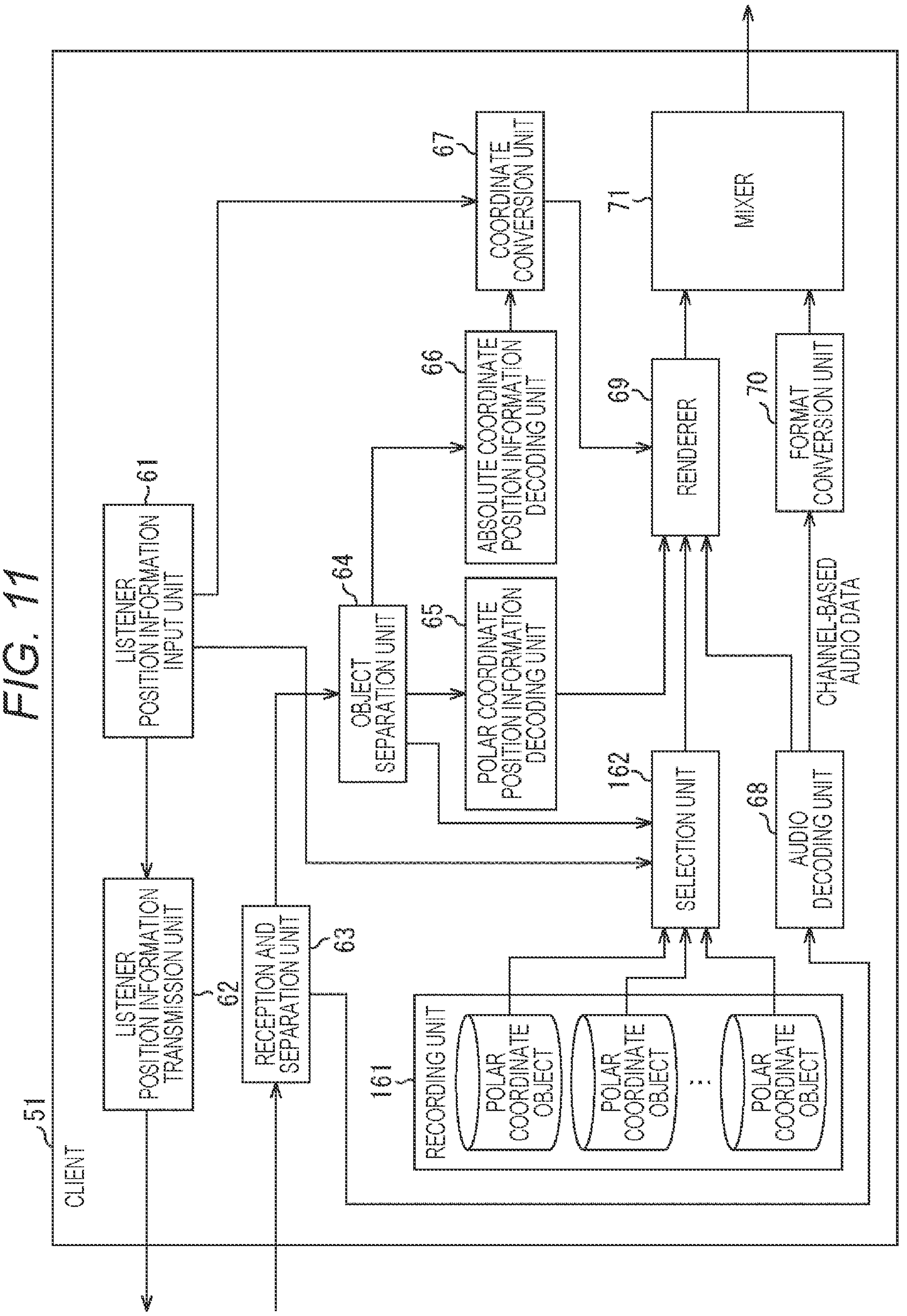
FIG. 11 is a diagram illustrating a configuration example of a client.

In such a case, a content reproduction system includes, for example, a server 11 illustrated in FIG. 4 and a client 51 illustrated in FIG. 11.

Note, however, that in the server 11, for a polar coordinate object of a specific category, only coded polar coordinate position information and gain information are included in the bit stream, and coded audio data corresponding to the coded polar coordinate position information is not included in the bit stream.

Additionally, FIG. 11 is a diagram illustrating a configuration example of the client 51. Note that in FIG. 11, the same reference numerals are given to the parts corresponding to those in FIG. 5, and the description thereof will be omitted as appropriate.

The client 51 illustrated in FIG. 11 includes a listener position information input unit 61, a listener position information transmission unit 62, a reception and separation unit 63, an object separation unit 64, a polar coordinate position information decoding unit 65, an absolute coordinate position information decoding unit 66, a coordinate conversion unit 67, a recording unit 161, a selection unit 162, an audio decoding unit 68, a renderer 69, a format conversion unit 70, and a mixer 71.

The client 51 illustrated in FIG. 11 is different from the client 51 in FIG. 5 in that a recording unit 161 and a selection unit 162 are newly provided, and has the same configuration as the client 51 in FIG. 5 in other points.

In the client 51 of FIG. 11, the listener position information input unit 61 generates group selection information indicating the object group selected by the listener according to the operation of the listener or the like, and supplies the group selection information to the selection unit 162.

The recording unit 161 records in advance audio data of polar coordinate objects of a specific category belonging to an object group for a plurality of object groups, and supplies the recorded audio data to the selection unit 162.

The selection unit 162 selects an object group indicated by the group selection information supplied from the listener position information input unit 61 from among the plurality of object groups prepared in advance.

Additionally, the selection unit 162 reads audio data of the polar coordinate objects of the specific category of the selected object group from the recording unit 161 on the basis of the position coding mode of the object supplied from the object separation unit 64, and supplies the audio data to the renderer 69.

Among the plurality of objects, which object is a polar coordinate object of a specific category can be specified by the position coding mode.

Additionally, for each polar coordinate object of the selected object group, the client 51 associates the audio data read from the recording unit 161 with polar coordinate position information and gain information extracted from the bit stream.

In the following description, assume that the specific category of the polar coordinate object whose audio data is recorded in the recording unit 161 is Category C1.

Note that the audio data of the polar coordinate object recorded in the recording unit 161 may be coded.

In such a case, the selection unit 162 reads the coded audio data of the polar coordinate object of the specific Category C1 of the selected object group from the recording unit 161, and supplies the coded audio data to the audio decoding unit 68.

Additionally, here, an example in which audio data is prepared in advance for each object group on the client 51 side only for the polar coordinate object of the specific Category C1 among the polar coordinate objects will be described.

However, audio data may be prepared in advance for each object group on the client 51 side for polar coordinate objects of all categories.

<Description of Transmission Processing and Reception Processing>

Next, an operation of the content reproduction system including the server 11 illustrated in FIG. 4 and the client 51 illustrated in FIG. 11 will be described.

Figure 12:
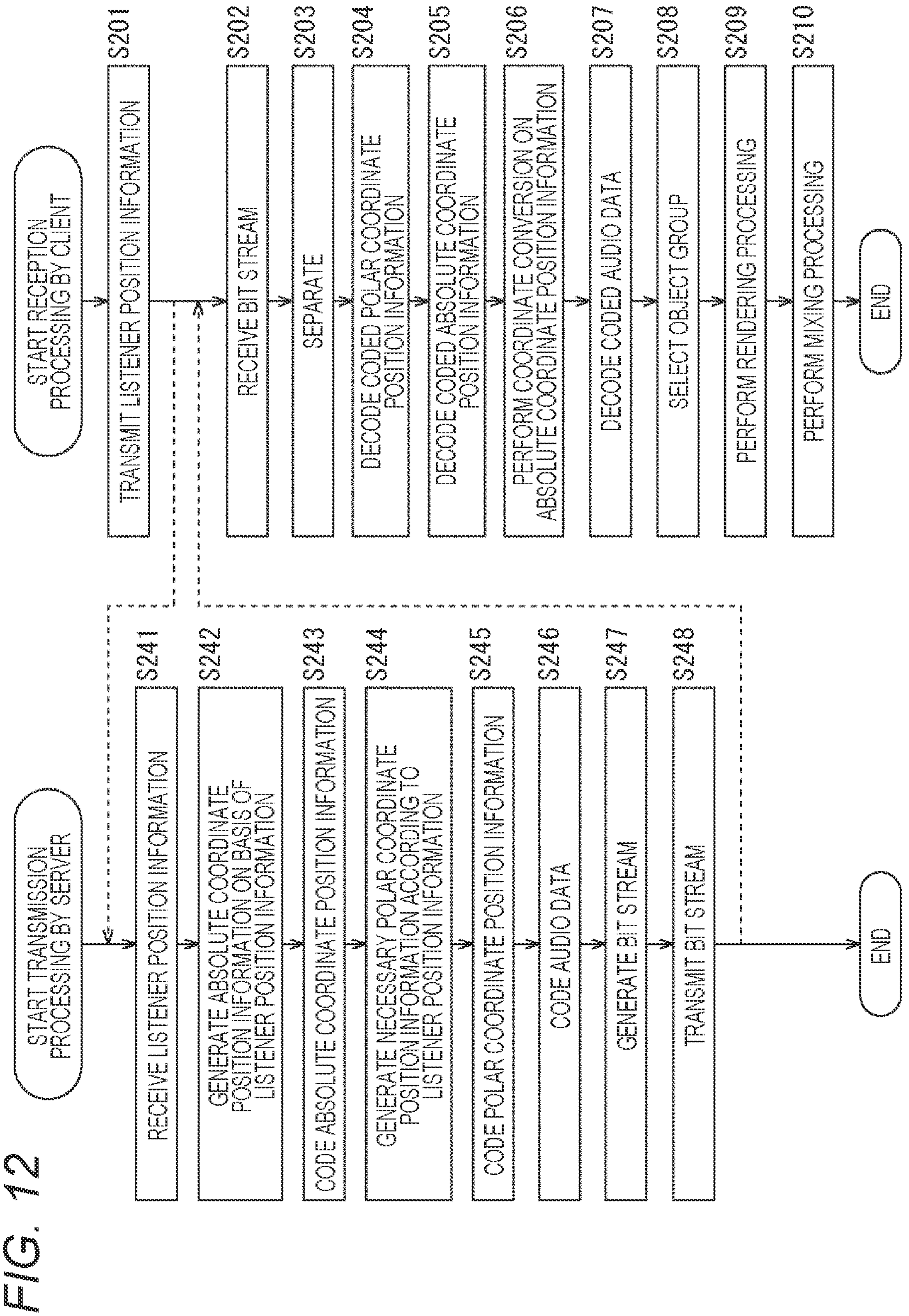
FIG. 12 is a flowchart illustrating transmission processing and reception processing.

That is, hereinafter, transmission processing by the server 11 and reception processing by the client 51 will be described with reference to the flowchart of FIG. 12.

Note that the processing of step S201 in the reception processing is similar to the processing of step S11 of FIG. 6, and the description thereof will be omitted.

Additionally, when an object group is designated (selected) by an operation of the listener or the like at an arbitrary timing, the listener position information input unit 61 supplies group selection information indicating the designated object group to the selection unit 162.

When the processing of step S201 is performed, the server 11 performs processing of steps S241 to S248 as the transmission processing.

Note that the processing of steps S241 to S248 is similar to the processing of steps S41 to S48 of FIG. 6, and the description thereof will be omitted.

Note, however, that in step S246, the audio data is not coded for the polar coordinate object of the predetermined specific Category C1.

Accordingly, the bit stream transmitted in step S248 includes the coded polar coordinate position information and the gain information but does not include the coded audio data for the polar coordinate object of Category C1.

When the processing of step S248 is performed and the transmission processing by the server 11 ends, the client 51 performs the processing of steps S202 to S207.

Note that the processing of steps S202 to S207 is similar to the processing of steps S12 to S17 of FIG. 6, and the description thereof will be omitted.

Note, however, that in step S203, the object separation unit 64 acquires the position coding mode of each object extracted from the bit stream from the reception and separation unit 63 and supplies the position coding mode to the selection unit 162.

Additionally, in step S204, the coded polar coordinate position information and the gain information of each polar coordinate object of all the categories are decoded.

Moreover, in step S207, the coded audio data of the absolute coordinate object, the coded audio data of the polar coordinate objects of Category C2 and Category C3, and the channel-based coded audio data are decoded.

In step S208, the selection unit 162 selects an object group on the basis of the group selection information supplied from the listener position information input unit 61.

Additionally, the selection unit 162 identifies a polar coordinate object of which the category is C1 on the basis of the position coding mode of each object supplied from the object separation unit 64.

For each polar coordinate object of Category C1, the selection unit 162 reads the audio data of the selected object group from the recording unit 161 and supplies the audio data to the renderer 69.

Then, the processing of steps S209 and S210 is performed and the reception processing ends. Since the processing is similar to the processing of steps S18 and S19 of FIG. 6, the description thereof will be omitted.

Note, however, that in step S209, the renderer 69 performs the rendering processing using not only the audio data supplied from the audio decoding unit 68 but also the audio data supplied from the selection unit 162.

As described above, the client 51 selects the object group on the basis of the group selection information, reads audio data of the polar coordinate object of the specific category of the selected object group, and performs the rendering processing.

In this way, the content can be reproduced with ground noise or reverberant sound that matches the taste of the listener, and the satisfaction of the listener can be improved.

Fifth Embodiment

<Configuration Example of Server and Client>

Additionally, in a case where the polar coordinate object is a reverberant sound object, whether to code and transmit polar coordinate position information and audio data or to transmit a reverb parameter for generating the reverberant sound instead of the polar coordinate position information and the audio data to the client 51 may be switched. Such switching is particularly useful, for example, in a case where the transmission capacity of the bit stream is limited.

For example, if audio data is prepared in advance for a polar coordinate object of reverberant sound, more faithful (highly accurate) reverberant sound, that is, reverberant sound closer to the actual sound can be reproduced from the audio data.

On the other hand, it is also possible to generate audio data of the polar coordinate object of the reverberant sound by reverb processing based on a reverb parameter without preparing audio data of the polar coordinate object of the reverberant sound in advance.

In this case, it is not possible to reproduce faithful reverberant sound as compared with the case of using audio data of the polar coordinate object of the reverberant sound prepared in advance, but since the polar coordinate position information and the audio data are unnecessary, the code amount of the bit stream can be reduced.

Additionally, at the time of reproducing a content, it is preferable to more faithfully reproduce reverberant sound related to the sound of an absolute coordinate object at a position close to the listener, but reverberant sound related to the sound of an absolute coordinate object at a position far from the listener does not cause a feeling of strangeness in audibility even if the reverberant sound is not faithfully reproduced.

Hence, for example, in a case where the distance between the listener and the absolute coordinate object is short, the coded polar coordinate position information and the coded audio data of a polar coordinate object corresponding to the absolute coordinate object may be transmitted to the client 51. Here, a polar coordinate object corresponding to the absolute coordinate object is, for example, an object of reverberant sound or the like generated by reflection of sound (direct sound) of the absolute coordinate object.

Conversely, in a case where the distance between the listener and the absolute coordinate object is long, a reverb parameter of a polar coordinate object corresponding to the absolute coordinate object may be transmitted to the client 51.

As a result, the code amount of the bit stream can be reduced without causing a feeling of strangeness in audibility.

Figure 13:
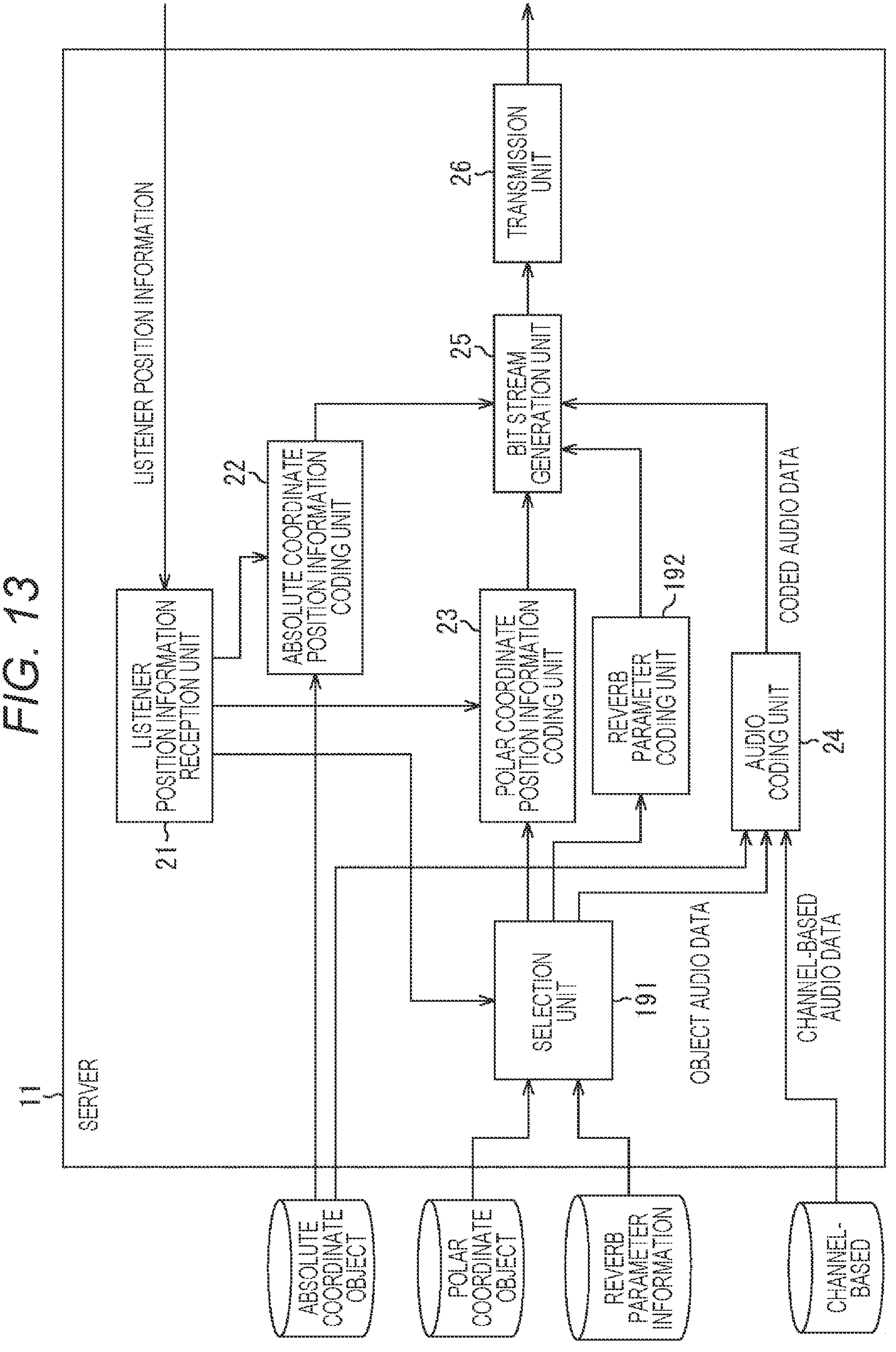
FIG. 13 is a diagram illustrating a configuration example of a server.
Figure 14:
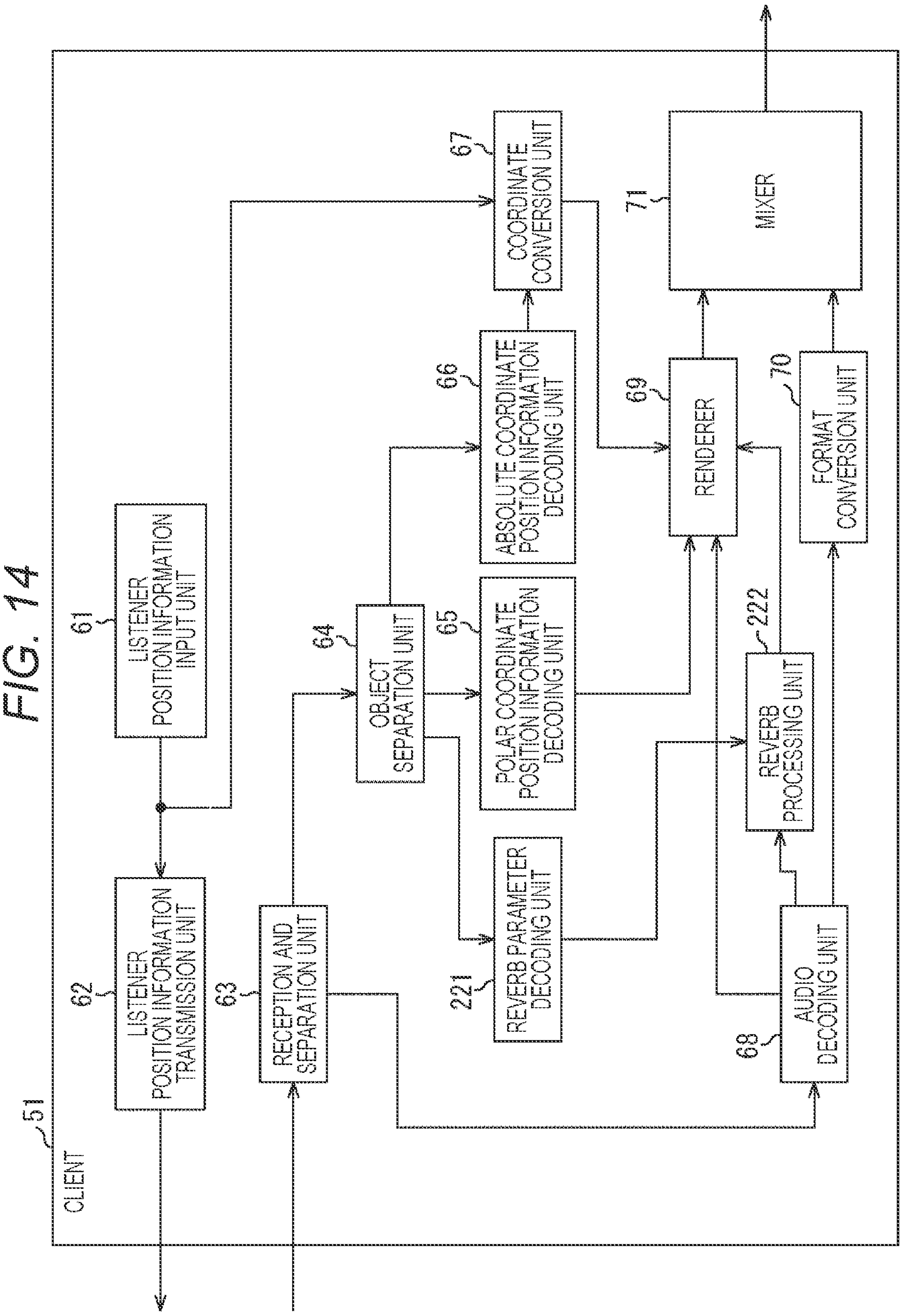
FIG. 14 is a diagram illustrating a configuration example of a client.

As described above, in a case where a reverb parameter is appropriately transmitted, a content reproduction system includes, for example, a server 11 illustrated in FIG. 13 and a client 51 illustrated in FIG. 14.

Note that in FIGS. 13 and 14, the same reference numerals are given to the parts corresponding to those in FIGS. 4 and 5, and the description thereof will be omitted as appropriate.

The server 11 illustrated in FIG. 13 includes a listener position information reception unit 21, an absolute coordinate position information coding unit 22, a selection unit 191, a reverb parameter coding unit 192, a polar coordinate position information coding unit 23, an audio coding unit 24, a bit stream generation unit 25, and a transmission unit 26.

The configuration of the server 11 in FIG. 13 is different from that of the server 11 in FIG. 4 in that the selection unit 191 and the reverb parameter coding unit 192 are newly provided, and is the same as that of the server 11 in FIG. 4 in other points.

In the example of FIG. 13, polar coordinate position information, gain information, audio data, and a reverb parameter are prepared in advance for one or a plurality of polar coordinate objects.

Note that there may be a polar coordinate object in which the reverb parameter is not prepared and the coded polar coordinate position information and the coded audio data are always stored in the bit stream and transmitted to the client 51, as a matter of course.

Hereinafter, in order to simplify the description, a case where there is one absolute coordinate object and one polar coordinate object included in the content will be described.

In this case, in particular, the absolute coordinate object is an object of a direct sound of a musical instrument or the like, and the polar coordinate object is an object of reverberant sound of the musical instrument or the like.

On the basis of listener position information supplied from the listener position information reception unit 21, the selection unit 191 selects whether to transmit polar coordinate position information or the like or a reverb parameter of the polar coordinate object.

For example, the selection unit 191 performs selection on the basis of the positional relationship between the listener and the absolute coordinate object identified from listener position information and absolute coordinate position information.

Specifically, for example, in a case where the distance from the listener to the absolute coordinate object is equal to or less than a predetermined threshold, the selection unit 191 selects transmission of polar coordinate position information or the like of the polar coordinate object corresponding to the absolute coordinate object.

In this case, the selection unit 191 acquires the polar coordinate position information and the gain information of the polar coordinate object and supplies the information to the polar coordinate position information coding unit 23, and acquires audio data of the polar coordinate object and supplies the audio data to the audio coding unit 24.

On the other hand, for example, in a case where the distance from the listener to the absolute coordinate object is larger than a predetermined threshold, the selection unit 191 acquires the reverb parameter of the polar coordinate object corresponding to the absolute coordinate object, and supplies the reverb parameter to the reverb parameter coding unit 192.

Note that the listener may select whether to transmit the polar coordinate position information or the like or the reverb parameter.

In such a case, the listener position information reception unit 21 receives selection information transmitted from the client 51 at an arbitrary timing and indicating the selection result of whether to transmit the polar coordinate position information or the like or the reverb parameter, and supplies the selection information to the selection unit 191.

On the basis of the selection information supplied from the listener position information reception unit 21, the selection unit 191 acquires polar coordinate position information or the like or the reverb parameter of the polar coordinate object.

In addition, for example, the selection unit 191 may select whether to transmit polar coordinate position information or the like or the reverb parameter, according to the state of the communication path (transmission path) between the server 11 and the client 51, that is, for example, the congestion state of the communication path.

Note that hereinafter, a state in which transmission of polar coordinate position information or the like is selected and the polar coordinate position information or the like is transmitted to the client 51 is also referred to as a position information-selected state.

Additionally, a state in which transmission of the reverb parameter is selected and the reverb parameter is transmitted to the client 51 is also referred to as a reverb-selected state.

The reverb parameter coding unit 192 codes the reverb parameter supplied from the selection unit 191, and supplies the coded reverb parameter to the bit stream generation unit 25.

Additionally, in a case where it is selected whether to transmit the polar coordinate position information or the like or the reverb parameter, the client 51 is configured as illustrated in FIG. 14.

The client 51 illustrated in FIG. 14 includes a listener position information input unit 61, a listener position information transmission unit 62, a reception and separation unit 63, an object separation unit 64, a reverb parameter decoding unit 221, a polar coordinate position information decoding unit 65, an absolute coordinate position information decoding unit 66, a coordinate conversion unit 67, an audio decoding unit 68, a reverb processing unit 222, a renderer 69, a format conversion unit 70, and a mixer 71.

The client 51 illustrated in FIG. 14 is different from the client 51 in FIG. 5 in that the reverb parameter decoding unit 221 and the reverb processing unit 222 are newly provided, and has the same configuration as the client 51 in FIG. 5 in other points.

In the example illustrated in FIG. 14, in a case where the coded reverb parameter of the polar coordinate object is included in the bit stream, the object separation unit 64 supplies the coded reverb parameter to the reverb parameter decoding unit 221.

The reverb parameter decoding unit 221 decodes the coded reverb parameter supplied from the object separation unit 64, and supplies the decoded reverb parameter to the reverb processing unit 222.

The reverb processing unit 222 performs reverb processing on the audio data of the absolute coordinate object supplied from the audio decoding unit 68 on the basis of the reverb parameter supplied from the reverb parameter decoding unit 221.

As a result, for example, audio data of the polar coordinate object of the reverberant sound of the musical instrument or the like is generated from the audio data of the absolute coordinate object of the direct sound of the musical instrument or the like.

The reverb processing unit 222 supplies the audio data of the polar coordinate object obtained by the reverb processing to the renderer 69.

The audio data of the polar coordinate object obtained in this manner is used for rendering processing in the renderer 69, and as the polar coordinate position information at that time, for example, information indicating a predetermined position, information indicating a position obtained from absolute coordinate position information, or the like is used.

<Description of Transmission Processing and Reception Processing>

Next, an operation of the content reproduction system including the server 11 illustrated in FIG. 13 and the client 51 illustrated in FIG. 14 will be described.

That is, hereinafter, transmission processing by the server 11 and reception processing by the client 51 will be described with reference to the flowchart of FIG. 15.

Note that in this case, too, in order to simplify the description, assume that there is one absolute coordinate object and one polar coordinate object.

When the reception processing is started in the client 51, the processing of step S271 is performed and the listener position information is transmitted to the server 11. Since the processing of step S271 is similar to the processing of step S11 of FIG. 6, the description thereof is omitted.

Additionally, in a case where the listener selects the position information-selected state or the reverb-selected state by operating the listener position information input unit 61 or the like, selection information indicating the selection result is supplied from the listener position information input unit 61 to the listener position information transmission unit 62.

Then, the listener position information transmission unit 62 transmits the selection information supplied from the listener position information input unit 61 to the server 11 at an arbitrary timing.

When the processing of step S271 is performed, the server 11 performs the processing of steps S311 to S313. Note that this processing is similar to the processing of steps S41 to S43 of FIG. 6, and the description thereof will be omitted.

Note, however, that in step S311, the listener position information reception unit 21 supplies the received listener position information to the absolute coordinate position information coding unit 22, the polar coordinate position information coding unit 23, and the selection unit 191. Additionally, when receiving the selection information transmitted from the client 51, the listener position information reception unit 21 supplies the selection information to the selection unit 191.

In step S314, the selection unit 191 determines whether or not to transmit the polar coordinate position information.

That is, the selection unit 191 selects whether to transmit the polar coordinate position information or the like or the reverb parameter on the basis of the listener position information or the selection information supplied from the listener position information reception unit 21.

If it is determined in step S314 that the polar coordinate position information is to be transmitted, the processing in steps S315 and S316 is then performed.

That is, the selection unit 191 acquires position information indicating the absolute position of the polar coordinate object and supplies the position information to the polar coordinate position information coding unit 23, and acquires audio data of the polar coordinate object and supplies the audio data to the audio coding unit 24.

Then, in step S315, the polar coordinate position information coding unit 23 generates polar coordinate position information of the polar coordinate object on the basis of the position information supplied from the selection unit 191 and the listener position information supplied from the listener position information reception unit 21.

Additionally, the polar coordinate position information coding unit 23 also generates gain information on the basis of the polar coordinate position information and the listener position information as necessary.

Note that in a case where the polar coordinate position information and the gain information are obtained in advance, the polar coordinate position information and the gain information are acquired by the selection unit 191 and supplied to the polar coordinate position information coding unit 23.

In step S316, the polar coordinate position information coding unit 23 codes the polar coordinate position information and the gain information, and supplies the coded information to the bit stream generation unit 25.

On the other hand, if it is determined in step S314 that the polar coordinate position information is not to be transmitted, that is, if it is determined that the reverb parameter is to be transmitted, thereafter, the processing proceeds to step S317.

In this case, the selection unit 191 acquires the reverb parameter of the polar coordinate object and supplies the reverb parameter to the reverb parameter coding unit 192.

In step S317, the reverb parameter coding unit 192 codes the reverb parameter supplied from the selection unit 191, and supplies the coded reverb parameter to the bit stream generation unit 25.

Note that, while a case where there is one polar coordinate object will be described herein as an example, in a case where there is a plurality of polar coordinate objects, the processing of steps S314 to S317 described above is performed for each polar coordinate object.

After the processing of step S316 is performed or the processing of step S317 is performed, the processing of step S318 is performed.

In step S318, the audio coding unit 24 codes the audio data, and supplies the coded audio data obtained as a result to the bit stream generation unit 25.

For example, in a case where the processing of steps S315 and S316 is performed, the audio coding unit 24 codes the acquired audio data of the absolute coordinate object, the audio data of the polar coordinate object supplied from the selection unit 191, and the acquired channel-based audio data.

On the other hand, in a case where the processing of step S317 is performed, the audio coding unit 24 codes the acquired audio data of the absolute coordinate object and the acquired channel-based audio data.

In step S319, the bit stream generation unit 25 generates a bit stream and supplies the bit stream to the transmission unit 26.

For example, in a case where the processing of steps S315 and S316 is performed, the bit stream generation unit 25 multiplexes the coded absolute coordinate position information from the absolute coordinate position information coding unit 22, the coded polar coordinate position information and the gain information from the polar coordinate position information coding unit 23, and the coded audio data from the audio coding unit 24 to generate a bit stream.

In this case, the bit stream includes the coded polar coordinate position information of the polar coordinate object, the gain information, and the coded audio data.

On the other hand, in a case where the processing of step S317 is performed, the bit stream generation unit 25 multiplexes the coded absolute coordinate position information from the absolute coordinate position information coding unit 22, the coded reverb parameter from the reverb parameter coding unit 192, and the coded audio data from the audio coding unit 24 to generate a bit stream.

In this case, the bit stream includes the reverb parameter of the polar coordinate object, but does not include the coded polar coordinate position information and the coded audio data of the polar coordinate object.

Note that in the reverb-selected state, it is also possible to store, for the polar coordinate object, the reverb parameter and the coded polar coordinate position information but not store the coded audio data in the bit stream.

When the processing of step S319 is performed, in step S320, the transmission unit 26 transmits the bit stream supplied from the bit stream generation unit 25 to the client 51, and the transmission processing ends.

Then, in the client 51, the processing of steps S272 to S276 is performed. Since this processing is similar to the processing of steps S12, S13, and S15 to S17 of FIG. 6, the description thereof will be omitted.

Note, however, that in a case where the coded audio data of the polar coordinate object is not included in the bit stream, the audio decoding unit 68 supplies the audio data of the absolute coordinate object obtained by decoding not only to the renderer 69 but also to the reverb processing unit 222.

That is, in a case where the bit stream includes the coded reverb parameter and it is the reverb-selected state, the audio data of the absolute coordinate object is also supplied to the reverb processing unit 222.

In step S277, the object separation unit 64 determines whether or not the coded polar coordinate position information is included in the received bit stream.

If it is determined in step S277 that the coded polar coordinate position information is included, the object separation unit 64 supplies the coded polar coordinate position information and the gain information supplied from the reception and separation unit 63 to the polar coordinate position information decoding unit 65, and thereafter, the processing proceeds to step S278.

In step S278, the polar coordinate position information decoding unit 65 decodes the coded polar coordinate position information and the gain information supplied from the object separation unit 64, and supplies the obtained polar coordinate position information and gain information to the renderer 69.

On the other hand, if it is determined in step S277 that coded polar coordinate position information is not included, that is, in a case where the coded reverb parameter is included in the bit stream, thereafter, the processing proceeds to step S279.

In this case, the object separation unit 64 supplies the coded reverb parameter supplied from the reception and separation unit 63 to the reverb parameter decoding unit 221.

In step S279, the reverb parameter decoding unit 221 decodes the coded reverb parameter supplied from the object separation unit 64, and supplies the decoded reverb parameter to the reverb processing unit 222.

In step S280, the reverb processing unit 222 performs reverb processing on the audio data of the absolute coordinate object supplied from the audio decoding unit 68 on the basis of the reverb parameter supplied from the reverb parameter decoding unit 221.

The reverb processing unit 222 supplies the audio data of the polar coordinate object obtained by the reverb processing to the renderer 69.

Note that, while a case where there is one polar coordinate object will be described herein as an example, in a case where there is a plurality of polar coordinate objects, the processing of steps S277 to S280 described above is performed for each polar coordinate object.

After the processing of step S278 or step S280 is performed, the processing of step S281 is performed.

In step S281, the renderer 69 performs rendering processing such as VBAP and supplies the resultant audio data to the mixer 71.

For example, if it is determined in step S277 that the coded polar coordinate position information is included, that is, in the position information-selected state, the renderer 69 performs rendering processing on the basis of the polar coordinate position information from the polar coordinate position information decoding unit 65, the polar coordinate position information from the coordinate conversion unit 67, and the audio data of the absolute coordinate object and the polar coordinate object from the audio decoding unit 68.

On the other hand, if it is determined in step S277 that coded polar coordinate position information is not included, that is, in the reverb-selected state, the renderer 69 performs the rendering processing on the basis of the polar coordinate position information from the coordinate conversion unit 67, the audio data of the absolute coordinate object from the audio decoding unit 68, and the audio data of the polar coordinate object from the reverb processing unit 222. In this case, as the polar coordinate position information of the polar coordinate object, for example, predetermined information or information generated from polar coordinate position information of the absolute coordinate object is used.

After the rendering processing is performed, the processing of step S282 is performed and the reception processing ends. Since the processing of step S282 is similar to the processing of step S19 of FIG. 6, the description thereof will be omitted.

As described above, the server 11 sets the position information-selected state or the reverb-selected state according to the listener position information or the selection information, and transmits the bit stream including the coded polar coordinate position information or the like or the reverb parameter.

As a result, it is possible to reduce the code amount of the bit stream without causing a feeling of strangeness in audibility, that is, while maintaining an acoustic effect.

Modification 1 of Fifth Embodiment

<Cross-Fade Processing>

Note that in the content reproduction system including the server 11 illustrated in FIG. 13 and the client 51 illustrated in FIG. 14, when switching from the position information-selected state to the reverb-selected state or switching from the reverb-selected state to the position information-selected state is instantaneously performed, there is a possibility that abnormal noise such as discontinuous noise occurs.

Hence, at the timing of switching from the position information-selected state to the reverb-selected state and the timing of switching from the reverb-selected state to the position information-selected state, smoothing such as cross-fade processing may be performed to suppress the occurrence of discontinuous noise or the like.

Here, a period including one or a plurality of frames of the audio data of the object at the time of switching from the position information-selected state to the reverb-selected state or at the time of switching from the reverb-selected state to the position information-selected state is also referred to as a switching period.

In this example, in the switching period, cross-fade processing based on audio data of a polar coordinate object obtained by reverb processing and audio data of a polar coordinate object obtained by decoding is performed.

Figure 15:
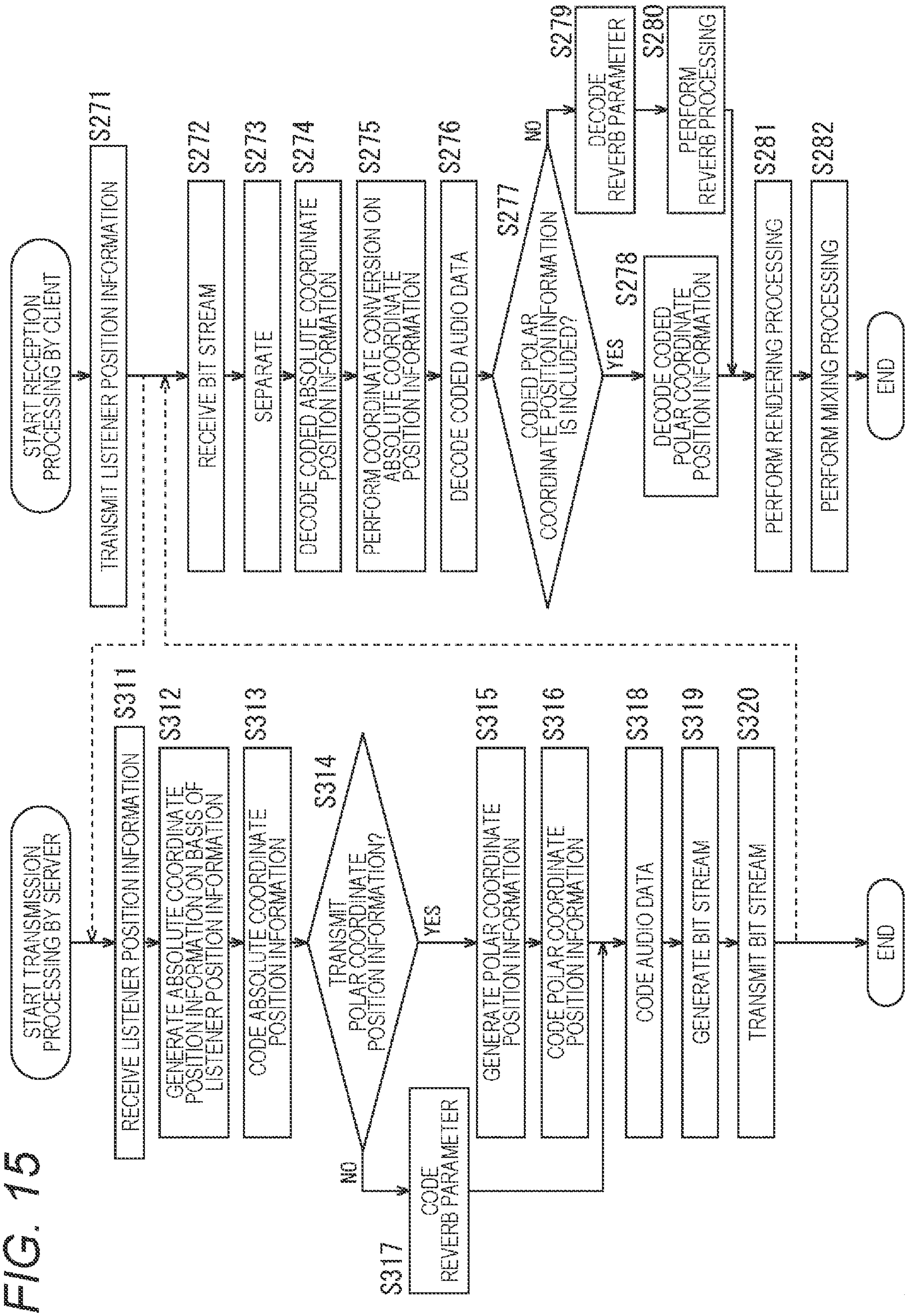
FIG. 15 is a flowchart illustrating transmission processing and reception processing.

In this case, basically, the transmission processing and the reception processing described with reference to FIG. 15 are performed by a server 11 and a client 51.

Note, however, that in the transmission processing performed by the server 11 in the switching period, both the processing of steps S315 and S316 and the processing of step S317 are performed.

Accordingly, the bit stream obtained in step S319 includes coded polar coordinate position information, gain information, coded audio data, and coded reverb parameter for a polar coordinate object.

For this reason, in the reception processing performed by the client 51 in the switching period, both the processing of step S278 and the processing of steps S289 and S280 are performed.

Accordingly, in the switching period, audio data of the polar coordinate object obtained by decoding is supplied from an audio decoding unit 68 to a renderer 69, and audio data of the polar coordinate object obtained by reverb processing is supplied from a reverb processing unit 222.

Hence, in step S281 performed in the switching period, the renderer 69 performs cross-fade processing on the basis of the audio data of the polar coordinate object obtained by decoding and the audio data of the polar coordinate object obtained by the reverb processing.

That is, for example, the renderer 69 performs weighted addition of the audio data obtained by decoding and the audio data obtained by the reverb processing while changing the weight with time so as to gradually switch from one to the other.

Then, the rendering processing is performed using the audio data of the polar coordinate object obtained by such crossfade processing.

As a result, the occurrence of discontinuous noise and the like can be curbed, and high-quality content reproduction can be achieved.

Sixth Embodiment

<Configuration Example of Server>

Moreover, polar coordinate position information may be prepared for each of a plurality of object groups on the server 11 side, and audio data of a polar coordinate object may be prepared for each of the plurality of object groups on the client 51 side.

Figure 16:
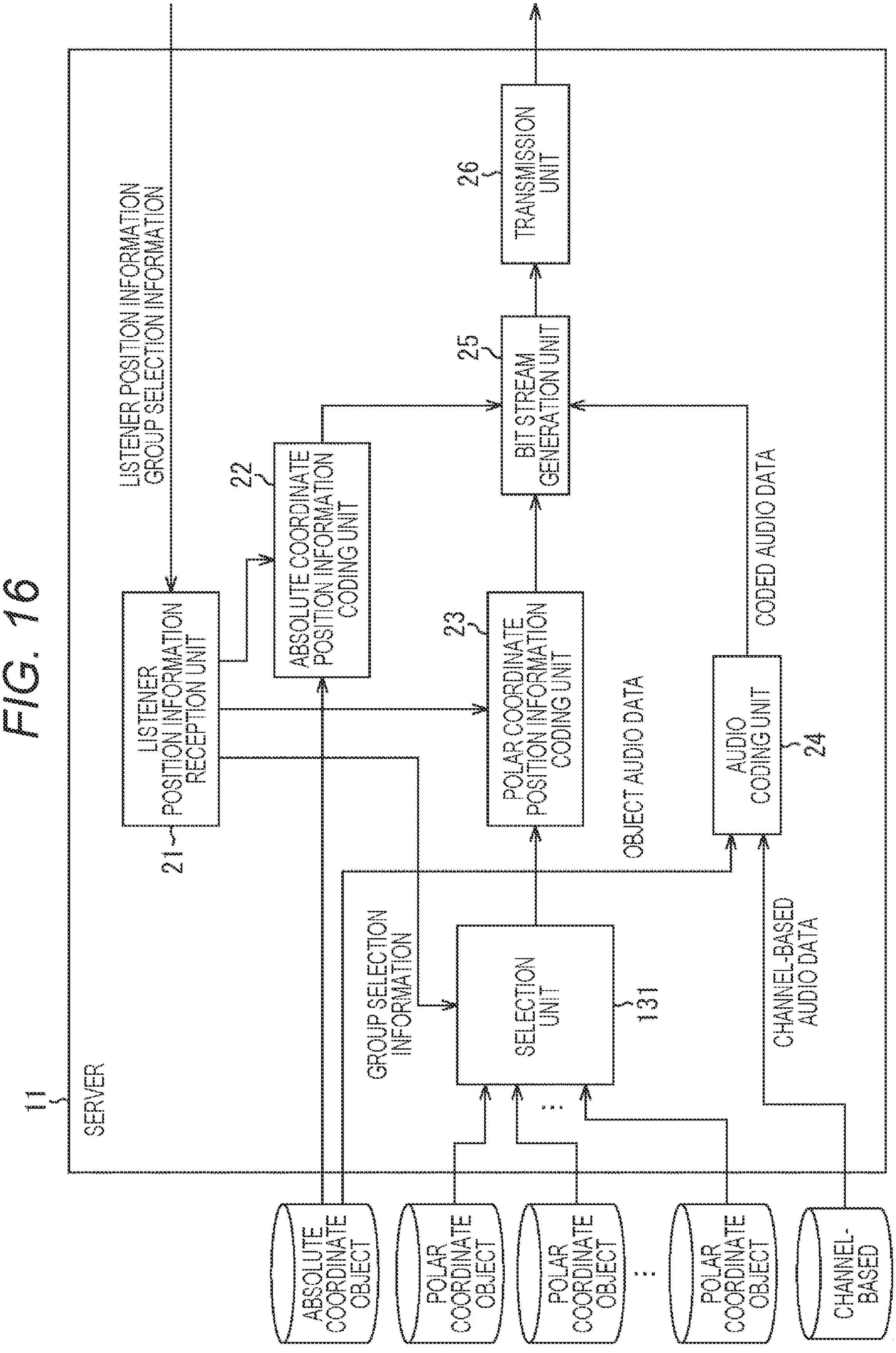
FIG. 16 is a diagram illustrating a configuration example of a server.

In such a case, a content reproduction system includes, for example, a server 11 illustrated in FIG. 16 and a client 51 illustrated in FIG. 11. Note that in FIG. 16, the same reference numerals are given to the parts corresponding to those in FIG. 9, and the description thereof will be omitted as appropriate.

The server 11 illustrated in FIG. 16 includes a listener position information reception unit 21, an absolute coordinate position information coding unit 22, a selection unit 131, a polar coordinate position information coding unit 23, an audio coding unit 24, a bit stream generation unit 25, and a transmission unit 26.

The configuration of the server 11 illustrated in FIG. 16 is basically the same as the configuration of the server 11 illustrated in FIG. 9, but the server 11 of FIG. 16 is different from the server 11 of FIG. 9 in that the selection unit 131 does not output audio data of a polar coordinate object to the audio coding unit 24.

That is, in the example of FIG. 16, the selection unit 131 selects an object group indicated by group selection information supplied from the listener position information reception unit 21 from among a plurality of object groups.

Then, the selection unit 131 acquires polar coordinate position information, gain information, and the like prepared in advance for the polar coordinate object of the selected object group, and supplies the information to the polar coordinate position information coding unit 23.

In particular, since audio data of the polar coordinate object for each object group is not prepared on the server 11 side, the selection unit 131 does not supply audio data of the polar coordinate object of the selected object group to the audio coding unit 24.

<Description of Transmission Processing and Reception Processing>

Next, an operation of the content reproduction system including the server 11 illustrated in FIG. 16 and the client 51 illustrated in FIG. 11 will be described.

Figure 17:
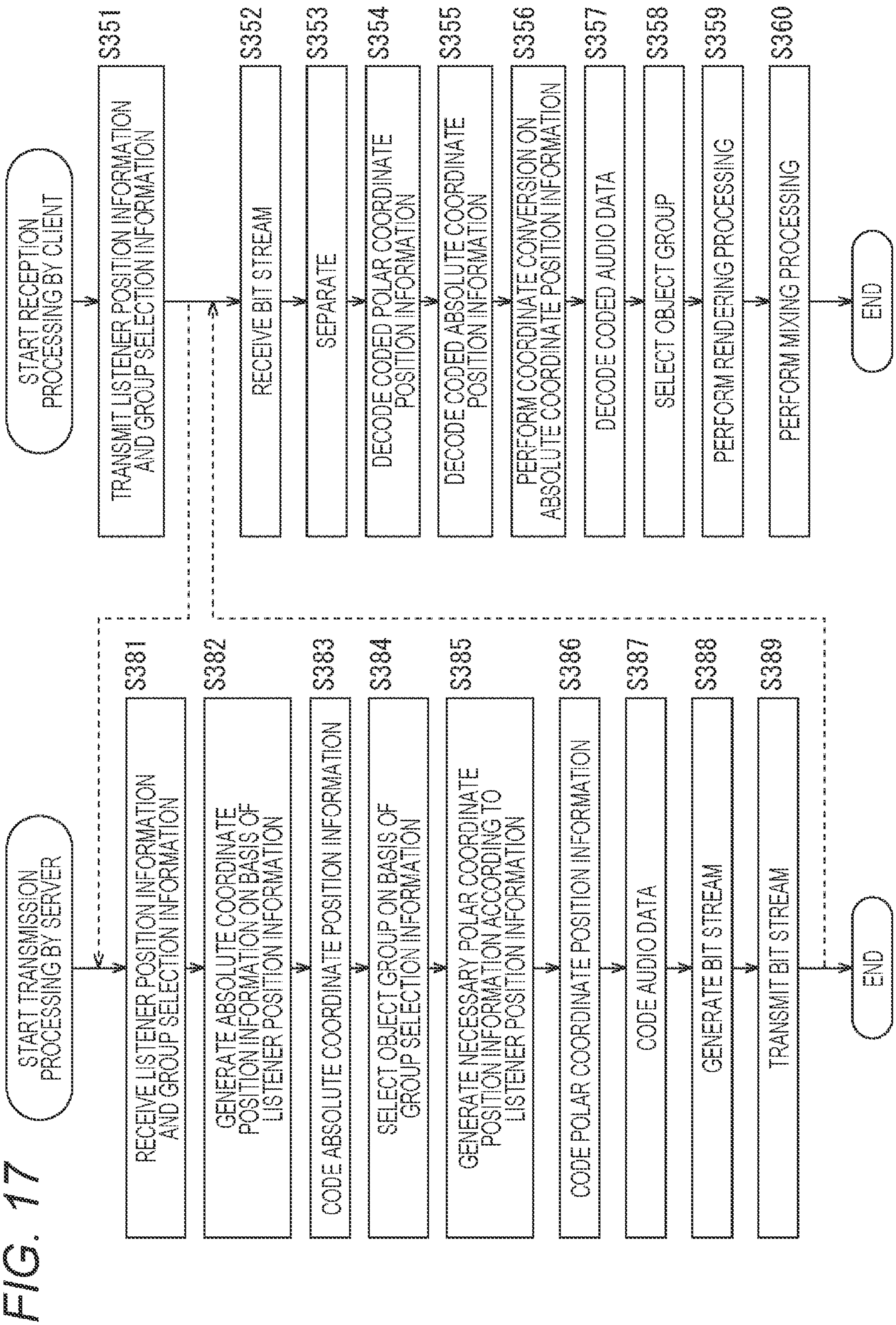
FIG. 17 is a flowchart illustrating transmission processing and reception processing.

That is, hereinafter, transmission processing by the server 11 and reception processing by the client 51 will be described with reference to the flowchart of FIG. 17.

When the reception processing by the client 51 is started, the processing of step S351 is performed and listener position information and group selection information are transmitted to the server 11. Since the processing of step S351 is similar to the processing of step S141 of FIG. 10, the description thereof is omitted.

Additionally, when the processing of step S351 is performed, the processing of steps S381 to S389 is performed as the transmission processing in the server 11. Since this processing is similar to the processing of steps S171 to S179 of FIG. 10, the description thereof will be omitted.

Note, however, that since the selection unit 131 does not acquire audio data of a polar coordinate object of the selected object group, audio data of the polar coordinate object of the selected object group is not coded in step S387. Accordingly, the bit stream transmitted in step S389 does not include coded audio data of the polar coordinate object.

Additionally, after the processing of step S389 is performed, the processing of steps S352 to S357 is performed in the client 51. Since this processing is similar to the processing of steps S142 to S147 of FIG. 10, the description thereof will be omitted.

Note, however, that in this example, since coded audio data of the polar coordinate object is not included in the bit stream, only audio data of the absolute coordinate object and channel-based audio data are obtained by decoding in step S357.

In step S358, the selection unit 162 selects an object group on the basis of group selection information supplied from the listener position information input unit 61.

Additionally, for each polar coordinate object, the selection unit 162 reads audio data of the selected object group from the recording unit 161 and supplies the audio data to the renderer 69.

After audio data of the polar coordinate object of the selected object group is read out in this manner, the processing of steps S359 and S360 is performed, and the reception processing ends. Note that this processing is similar to the processing of step S148 and step S149 of FIG. 10, and the description thereof will be omitted.

Additionally, in the above description, for all the polar coordinate objects of the selected object group, the polar coordinate position information and the gain information are read and coded on the server 11 side, and the audio data is read and rendered on the client 51 side.

However, the present invention is not limited thereto, and it is also possible to read and render audio data on the client 51 side only for a polar coordinate object of a specific category of the selected object group. In such a case, the selection unit 162 identifies a polar coordinate object of the specific category on the basis of the position coding mode of each object supplied from the object separation unit 64.

As described above, the server 11 selects an object group on the basis of group selection information, and reads and codes polar coordinate position information and gain information of the polar coordinate object of the selected object group.

Additionally, the client 51 selects an object group on the basis of group selection information, reads audio data of polar coordinate objects of the selected object group, and performs rendering processing.

In this way, the content can be reproduced with ground noise or reverberant sound that matches the taste of the listener, and the satisfaction of the listener can be improved.

<Computer Configuration Example>

Incidentally, the series of processing described above can be performed by hardware or software. In a case where the series of processing is performed by software, a program that is included in the software is installed on a computer. Here, the computer includes a computer incorporated in dedicated hardware, a general-purpose personal computer, for example, that can execute various functions by installing various programs, and the like.

Figure 18:
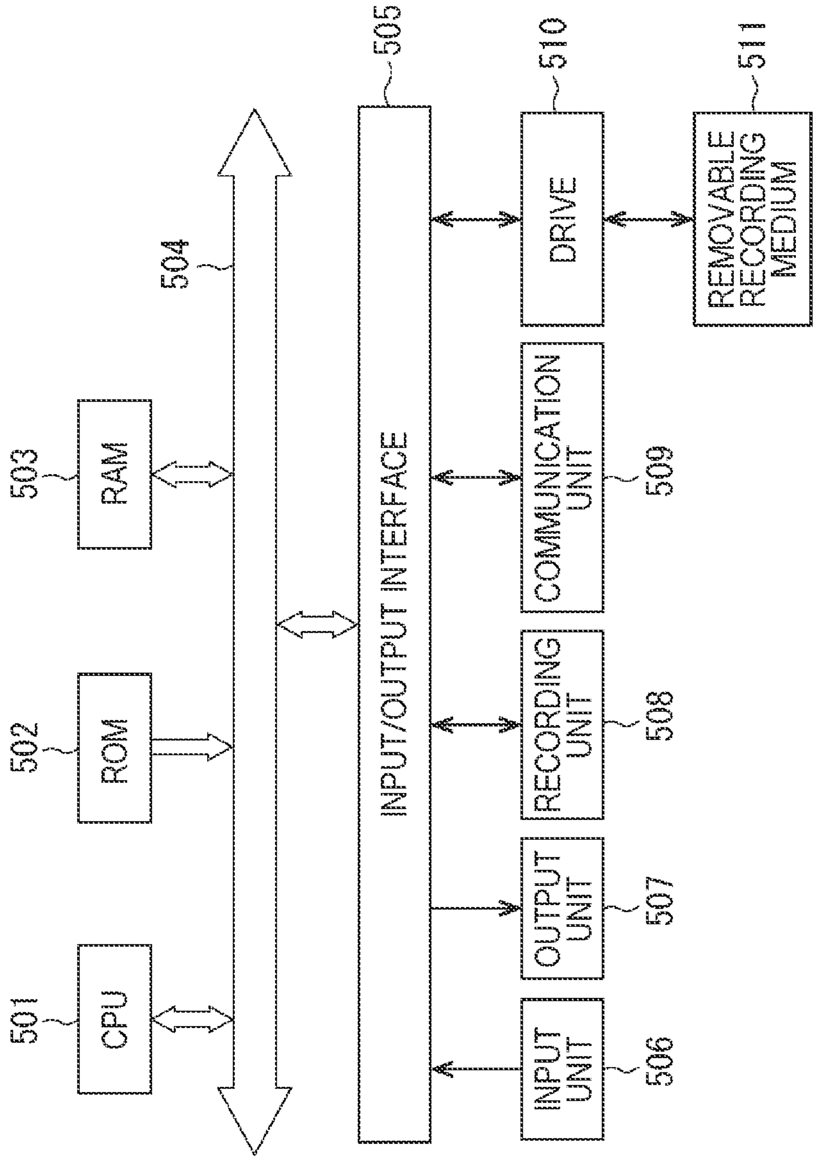
FIG. 18 is a diagram illustrating a configuration example of a computer.

FIG. 18 is a block diagram illustrating a hardware configuration example of a computer that executes the series of processing described above according to a program.

In a computer, a central processing unit (CPU) 501, a read only memory (ROM) 502, and a random access memory (RAM) 503 are mutually connected by a bus 504.

An input/output interface 505 is also connected to the bus 504. An input unit 506, an output unit 507, a recording unit 508, a communication unit 509, and a drive 510 are connected to the input/output interface 505.

The input unit 506 includes a keyboard, a mouse, a microphone, an imaging device, and the like. The output unit 507 includes a display, a speaker, and the like. The recording unit 508 includes a hard disk, a nonvolatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, for example, the CPU 501 loads a program recorded in the recording unit 508 to the RAM 503 through the input/output interface 505 and the bus 504, and executes the program to perform the above-described series of processing.

The program executed by the computer (CPU 501) can be provided by being recorded on the removable recording medium 511 such as a package medium, for example. Additionally, the program can be provided through a wired or wireless transmission medium such as a local area network, the Internet, or digital satellite broadcasting.

In the computer, the program can be installed in the recording unit 508 through the input/output interface 505 by attaching the removable recording medium 511 to the drive 510. Additionally, the program can be received by the communication unit 509 through a wired or wireless transmission medium and be installed in the recording unit 508.

In addition, the program can be installed in advance in the ROM 502 or the recording unit 508.

Note that the program executed by the computer may be a program that performs processing in chronological order according to the order described in the present specification, or a program that performs processing in parallel, or at a necessary timing such as when a call is made.

Additionally, the embodiment of the present technology is not limited to the above-described embodiment, and various modifications can be made without departing from the scope of the present technology.

For example, the present technology can have a cloud computing configuration in which one function is shared and processed by a plurality of devices through a network.

Additionally, each step described in the above-described flowchart can be executed by one device or be executed in a shared manner by a plurality of devices.

Moreover, in a case where a plurality of processing is included in one step, the plurality of processing included in one step can be executed by one device or be executed in a shared manner by a plurality of devices.

Moreover, the present technology may have the following configurations.

(1)

A signal processing device including:

an acquisition unit that acquires polar coordinate position information indicating a position of a first object expressed by polar coordinates, audio data of the first object, absolute coordinate position information indicating a position of a second object expressed by absolute coordinates, and audio data of the second object;

a coordinate conversion unit that converts the absolute coordinate position information into polar coordinate position information indicating a position of the second object; and a rendering processing unit that performs rendering processing on the basis of the polar coordinate position information and the audio data of the first object and the polar coordinate position information and the audio data of the second object.

(2)

The signal processing device according to (1), in which the coordinate conversion unit converts the absolute coordinate position information of the second object into the polar coordinate position information on the basis of listener position information indicating an absolute position of a listener.

(3)

The signal processing device according to (2), in which the acquisition unit acquires the absolute coordinate position information of the second object on the basis of the listener position information.

(4)

The signal processing device according to (3), in which the acquisition unit acquires the absolute coordinate position information with accuracy corresponding to a positional relationship between the listener and the second object on the basis of the listener position information.

(5)

The signal processing device according to any one of (2) to (4), in which the acquisition unit acquires the polar coordinate position information indicating a position of the first object viewed from the listener on the basis of the listener position information.

(6)

The signal processing device according to any one of (1) to (5), in which the rendering processing unit performs the rendering processing in a polar coordinate system defined by MPEG-H.

(7)

The signal processing device according to any one of (1) to (6), in which the first object is an object of reverberant sound or ground noise.

(8)

The signal processing device according to any one of (1) to (7), in which the acquisition unit further acquires gain information of the first object, and the polar coordinate position information or the gain information of the first object is a predetermined fixed value.

(9)

The signal processing device according to any one of (1) to (8), in which the acquisition unit acquires the polar coordinate position information and the audio data of the first object selected by a listener.

(10)

The signal processing device according to any one of (1) to (9), in which the acquisition unit further acquires channel-based audio data, and the signal processing device further includes a mixing processing unit that mixes the channel-based audio data and audio data obtained by the rendering processing.

(11)

The signal processing device according to (10), in which the channel-based audio data is audio data for reproducing ground noise.

(12)

The signal processing device according to any one of (1) to (8), in which the acquisition unit acquires the polar coordinate position information and the audio data or acquires a reverb parameter for the first object, and the signal processing device further includes a reverb processing unit that, in a case where the reverb parameter is acquired, performs reverb processing on the basis of the audio data of the second object corresponding to the first object and the reverb parameter to generate the audio data of the first object.

(13)

A signal processing method including:

a signal processing device acquiring polar coordinate position information indicating a position of a first object expressed by polar coordinates, audio data of the first object, absolute coordinate position information indicating a position of a second object expressed by absolute coordinates, and audio data of the second object;

converting the absolute coordinate position information into polar coordinate position information indicating a position of the second object; and performing rendering processing on the basis of the polar coordinate position information and the audio data of the first object and the polar coordinate position information and the audio data of the second object.

(14)

A program for causing a computer to execute processing including the steps of:

acquiring polar coordinate position information indicating a position of a first object expressed by polar coordinates, audio data of the first object, absolute coordinate position information indicating a position of a second object expressed by absolute coordinates, and audio data of the second object;

converting the absolute coordinate position information into polar coordinate position information indicating a position of the second object; and performing rendering processing on the basis of the polar coordinate position information and the audio data of the first object and the polar coordinate position information and the audio data of the second object.

(15)

A signal processing device including:

a polar coordinate position information coding unit that codes polar coordinate position information indicating a position of a first object expressed by polar coordinates;

an absolute coordinate position information coding unit that codes absolute coordinate position information indicating a position of a second object expressed by absolute coordinates;

an audio coding unit that codes audio data of the first object and audio data of the second object; and a bit stream generation unit that generates a bit stream including the coded polar coordinate position information, the coded absolute coordinate position information, the coded audio data of the first object, and the coded audio data of the second object.

(16)

The signal processing device according to (15), in which the absolute coordinate position information coding unit codes the absolute coordinate position information with accuracy corresponding to listener position information indicating an absolute position of a listener.

(17)

The signal processing device according to (16), in which the absolute coordinate position information coding unit codes the absolute coordinate position information with accuracy corresponding to a positional relationship between the listener and the second object.

(18)

The signal processing device according to (16) or (17), in which the polar coordinate position information coding unit codes the polar coordinate position information indicating a position of the first object viewed from the listener.

(19)

A signal processing method including:

a signal processing device coding polar coordinate position information indicating a position of a first object expressed by polar coordinates;

coding absolute coordinate position information indicating a position of a second object expressed by absolute coordinates; coding audio data of the first object and audio data of the second object; and generating a bit stream including the coded polar coordinate position information, the coded absolute coordinate position information, the coded audio data of the first object, and the coded audio data of the second object.

(20)

A program for causing a computer to execute processing including the steps of:

coding polar coordinate position information indicating a position of a first object expressed by polar coordinates;

coding absolute coordinate position information indicating a position of a second object expressed by absolute coordinates;

coding audio data of the first object and audio data of the second object; and generating a bit stream including the coded polar coordinate position information, the coded absolute coordinate position information, the coded audio data of the first object, and the coded audio data of the second object.

REFERENCE SIGNS LIST

11 Server
22 Absolute coordinate position information coding unit
23 Polar coordinate position information coding unit
24 Audio coding unit
25 Bit stream generation unit
26 Transmission unit
51 Client
65 Polar coordinate position information decoding unit
66 Absolute coordinate position information decoding unit
67 Coordinate conversion unit
68 Audio decoding unit
69 Renderer
71 Mixer

The invention claimed is:

1. A signal processing device, comprising:

an acquisition unit configured to acquire first polar coordinate position information, audio data of a first object, absolute coordinate position information, and audio data of a second object, wherein the first polar coordinate position information indicates a position of the first object based on polar coordinates, and the absolute coordinate position information indicates a position of the second object based on absolute coordinates;

a coordinate conversion unit configured to convert the absolute coordinate position information into second polar coordinate position information that indicates the position of the second object; and a rendering processing unit configured to perform rendering process based on the first polar coordinate position information and the audio data of the first object and the second polar coordinate position information and the audio data of the second object.

2. The signal processing device according to claim 1, wherein the coordinate conversion unit is further configured to convert the absolute coordinate position information of the second object into the second polar coordinate position information based on listener position information that indicates an absolute position of a listener.

3. The signal processing device according to claim 2, wherein the acquisition unit is further configured to acquire the absolute coordinate position information of the second object based on the listener position information.

4. The signal processing device according to claim 3, wherein the acquisition unit is further configured to acquire, based on the listener position information, the absolute coordinate position information with accuracy corresponding to a positional relationship between the listener and the second object.

5. The signal processing device according to claim 2, wherein the acquisition unit is further configured to acquire, based on the listener position information, the first polar coordinate position information indicating that indicates the position of the first object viewable from the listener.

6. The signal processing device according to claim 1, wherein the rendering processing unit is further configured to perform the rendering processing in a polar coordinate system defined by MPEG-H.

7. The signal processing device according to claim 1, wherein the first object is an object of one of reverberant sound or ground noise.

8. The signal processing device according to claim 1, wherein the acquisition unit is further configured to acquire gain information of the first object, and the first polar coordinate position information or the gain information of the first object is a specific fixed value.

9. The signal processing device according to claim 1, wherein the acquisition unit is further configured to acquire the first polar coordinate position information and the audio data of the first object selected by a listener.

10. The signal processing device according to claim 1, wherein the acquisition unit is further configured to acquire channel-based audio data, and the signal processing device further comprises a mixing processing unit configured to mix the channel-based audio data and audio data obtained by the rendering processing.

11. The signal processing device according to claim 10, wherein the channel-based audio data is audio data to reproduce ground noise.

12. The signal processing device according to claim 1, wherein the acquisition unit is further configured to acquire the first polar coordinate position information and the audio data or acquire a reverb parameter for the first object, and the signal processing device further comprises a reverb processing unit that, in a case where the reverb parameter is acquired, is configured to perform reverb processing based on the audio data of the second object corresponding to the first object and the reverb parameter to generate the audio data of the first object.

13. A signal processing method, comprising:

in a signal processing device;

acquiring first polar coordinate position information, audio data of a first object, absolute coordinate position information, and audio data of a second object, wherein the first polar coordinate position information indicates a position of the first object based on polar coordinates, and the absolute coordinate position information indicates a position of the second object based on absolute coordinates;

converting the absolute coordinate position information into second polar coordinate position information indicating the position of the second object; and performing rendering processing based on the first polar coordinate position information and the audio data of the first object and the second polar coordinate position information and the audio data of the second object.

14. A non-transitory computer-readable medium having stored thereon, computer-executable instructions which, when executed by a computer, cause the computer to execute operations, the operations comprising:

acquiring first polar coordinate position information, audio data of a first object, absolute coordinate position information, and audio data of a second object, wherein the first polar coordinate position information indicates a position of the first object based on polar coordinates, and the absolute coordinate position information indicates a position of the second object based on absolute coordinates;

converting the absolute coordinate position information into second polar coordinate position information indicating the position of the second object; and performing rendering processing based on the first polar coordinate position information and the audio data of the first object and the second polar coordinate position information and the audio data of the second object.

15. A signal processing device, comprising:

a polar coordinate position information coding unit configured to code polar coordinate position information, wherein the polar coordinate position information indicates a position of a first object based on polar coordinates;

an absolute coordinate position information coding unit configured to code absolute coordinate position information, wherein the absolute coordinate position information indicates a position of a second object based on absolute coordinates;

an audio coding unit configured to code audio data of the first object and audio data of the second object; and a bit stream generation unit configured to generate a bit stream that includes the coded polar coordinate position information, the coded absolute coordinate position information, the coded audio data of the first object, and the coded audio data of the second object.

16. The signal processing device according to claim 15, wherein the absolute coordinate position information coding unit is further configured to code the absolute coordinate position information with accuracy corresponding to listener position information that indicates an absolute position of a listener.

17. The signal processing device according to claim 16, wherein the absolute coordinate position information coding unit is further configured to code the absolute coordinate position information with accuracy corresponding to a positional relationship between the listener and the second object.

18. The signal processing device according to claim 16, wherein the polar coordinate position information coding unit is further configured to code the polar coordinate position information that indicates the position of the first object viewable from the listener.

19. A signal processing method, comprising:

in a signal processing device:

coding polar coordinate position information, wherein the polar coordinate position information indicates a position of a first object based on polar coordinates;

coding absolute coordinate position information, wherein the absolute coordinate position information indicates a position of a second object based on absolute coordinates;

coding audio data of the first object and audio data of the second object; and generating a bit stream including the coded polar coordinate position information, the coded absolute coordinate position information, the coded audio data of the first object, and the coded audio data of the second object.

20. A non-transitory computer-readable medium having stored thereon, computer-executable instructions which, when executed by a computer, cause the computer to execute operations, the operations comprising:

coding polar coordinate position information, wherein the polar coordinate position information indicates a position of a first object based on polar coordinates;

coding absolute coordinate position information, wherein the absolute coordinate position information indicates a position of a second object based on absolute coordinates;

coding audio data of the first object and audio data of the second object; and generating a bit stream including the coded polar coordinate position information, the coded absolute coordinate position information, the coded audio data of the first object, and the coded audio data of the second object.

* * * * *